United States Patent
Zhu et al.

(10) Patent No.: US 12,382,341 B2
(45) Date of Patent: *Aug. 5, 2025

(54) HIGH BANDWIDTH LOW LATENCY CELLULAR TRAFFIC AWARENESS

(71) Applicant: QUALCOMM Incorporated, San Diego, CA (US)

(72) Inventors: Xipeng Zhu, San Diego, CA (US); Prashanth Haridas Hande, San Diego, CA (US); Gavin Bernard Horn, La Jolla, CA (US); Thomas Stockhammer, Bergen (DE)

(73) Assignee: QUALCOMM Incorporated, San Diego, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 18/465,526

(22) Filed: Sep. 12, 2023

(65) Prior Publication Data
US 2024/0007901 A1    Jan. 4, 2024

Related U.S. Application Data

(63) Continuation of application No. 16/900,249, filed on Jun. 12, 2020, now Pat. No. 11,792,686.
(Continued)

(51) Int. Cl.
*H04W 28/06* (2009.01)
*H04L 101/659* (2022.01)
*H04W 80/06* (2009.01)

(52) U.S. Cl.
CPC ..... *H04W 28/065* (2013.01); *H04L 2101/659* (2022.05); *H04W 80/06* (2013.01)

(58) Field of Classification Search
CPC .............. H04W 28/065; H04W 80/06; H04W 28/0268; H04W 28/02; H04L 2101/659; H04L 69/22; H04L 67/06; H04L 67/30
See application file for complete search history.

(56) References Cited

U.S. PATENT DOCUMENTS 6,519,223 B1   2/2003   Wager et al.
6,640,248 B1   10/2003  Jorgensen
(Continued)

FOREIGN PATENT DOCUMENTS

CN   111586750   *   8/2020
WO   2020036928 A1   2/2020

OTHER PUBLICATIONS

Ericsson, et al., "An Improved Flow Control on the GB-Interface Based on QoS; Concept Document", 3GPP TSG Geran #9 GP-020965, 3RD Generation Partnership Project (3GPP), Mobile Competence Centre, 650, Route Des Lucioles, F-06921 Sophia-Antipolis Cedex, France, vol. TSG GERAN. No. Seattle, Apr. 15-19, 2002, XP050005655, pp. 1-7, [retrieved on Apr. 11, 2002], Section 2-5.
(Continued)

*Primary Examiner* — Sudesh M. Patidar
(74) *Attorney, Agent, or Firm* — QUALCOMM INCORPORATED

(57) ABSTRACT

Disclosed are techniques for wireless communication. In an aspect, a network node configures a quality of service (QoS) profile comprising one or more file-level QoS parameters, wherein the QoS profile applies to one or more files associated with a service flow associated with a user equipment (UE), wherein each file of the one or more files comprises one or more protocol data units (PDUs), and wherein a header of each PDU of the one or more PDUs of the file includes a file identifier and a file type of the file, and enforces the QoS profile on the one or more files.

20 Claims, 11 Drawing Sheets

Related U.S. Application Data

(60) Provisional application No. 62/863,720, filed on Jun. 19, 2019.

(56) References Cited

U.S. PATENT DOCUMENTS

| | | |
|---|---|---|
| 2008/0002592 A1 | 1/2008 | Yegani et al. |
| 2010/0015920 A1 | 1/2010 | Kim |
| 2014/0233571 A1 | 8/2014 | Pope et al. |
| 2014/0294093 A1 | 10/2014 | Wang |
| 2016/0255171 A1 | 9/2016 | Salinger et al. |
| 2017/0317894 A1 | 11/2017 | Dao et al. |
| 2018/0199228 A1 | 7/2018 | Van Phan et al. |
| 2018/0376446 A1 | 12/2018 | Youn et al. |
| 2019/0082039 A1 | 3/2019 | Tapia |
| 2019/0109721 A1 | 4/2019 | Qiao et al. |
| 2019/0215730 A1 | 7/2019 | Qiao et al. |
| 2020/0022018 A1 | 1/2020 | Cho et al. |
| 2020/0112907 A1 | 4/2020 | Dao et al. |
| 2020/0252853 A1 | 8/2020 | Shi et al. |
| 2020/0267753 A1 | 8/2020 | Adjakple et al. |
| 2020/0296618 A1 | 9/2020 | You et al. |
| 2020/0334643 A1 | 10/2020 | Tang et al. |
| 2020/0374948 A1 | 11/2020 | Pan et al. |
| 2020/0396643 A1 | 12/2020 | Kwok et al. |
| 2020/0404538 A1 | 12/2020 | Zhu |
| 2021/0075864 A1* | 3/2021 | Sun .................. H04W 28/0236 |
| 2021/0144579 A1 | 5/2021 | Ke et al. |
| 2021/0153070 A1 | 5/2021 | Velev et al. |
| 2024/0015589 A1 | 1/2024 | Zhu |

OTHER PUBLICATIONS

International Preliminary Report on Patentability—PCT/US2020/037755, The International Bureau of WIPO—Geneva, Switzerland, Dec. 30, 2021.

International Search Report and Written Opinion—PCT/US2020/037755—ISA/EPO—Sep. 14, 2020.

* cited by examiner

HIGH BANDWIDTH LOW LATENCY CELLULAR TRAFFIC AWARENESS

CROSS-REFERENCE TO RELATED APPLICATIONS

The present application for patent is a continuation of U.S. patent application Ser. No. 16/900,249, entitled "HIGH BANDWIDTH LOW LATENCY CELLULAR TRAFFIC AWARENESS," filed Jun. 12, 2020, which claims the benefit of U.S. Provisional Application No. 62/863,720, entitled "EXTENDED REALITY (XR) CELLULAR TRAFFIC AWARENESS," filed Jun. 19, 2019, each of which is assigned to the assignee hereof, and expressly incorporated herein by reference in its entirety.

INTRODUCTION

Aspects of this disclosure relate generally to wireless communications and the like.

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

A fifth generation (5G) wireless standard enables higher data transfer speeds, greater numbers of connections, and better coverage, among other improvements. The 5G standard (also referred to as New Radio (NR)), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of 5G mobile communications should be significantly enhanced compared to the current 4G standard. Furthermore, signaling efficiencies should be enhanced and latency should be substantially reduced compared to current standards.

Due to the increased speeds and reduced latency offered by 5G, technologies that require high data rates and low latency, such as extended reality (XR), can now utilize cellular networks for wireless communications.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a network node includes configuring a quality of service (QoS) profile comprising one or more file-level QoS parameters, wherein the QoS profile applies to one or more files associated with a service flow associated with a user equipment (UE), wherein each file of the one or more files comprises one or more protocol data units (PDUs), and wherein a header of each PDU of the one or more PDUs of the file includes a file identifier and a file type of the file, and enforcing the QoS profile on the one or more files.

In an aspect, a method of wireless communication performed by an application server includes transmitting, to a user plane function (UPF), at least one file of at least one burst of files destined for an application associated with a UE, wherein the at least one file is transmitted in one or more PDUs, and wherein a header of each PDU of the one or more transmitted PDUs includes a file identifier and a file type of the at least one file and a burst identifier of the at least one burst, determining a file-level QoS profile for the at least one file of the at least one burst, transmitting the file-level QoS profile to a session management function (SMF).

In an aspect, a method of wireless communication performed by a UE includes receiving, from an application associated with the UE, at least one file of at least one burst of files destined for an application server, wherein the at least one file is received in one or more PDUs, and wherein a header of each PDU of the one or more received PDUs includes a file identifier and a file type of the at least one file and a burst identifier of the at least one burst, encoding the file identifier, the file type, and the burst identifier in headers of each of one or more uplink PDUs, and forwarding the one or more uplink PDUs to a radio access network (RAN) serving the UE.

In an aspect, a network node includes a memory, and at least one processor coupled to the memory, the memory and the at least one processor configured to: configure a QoS profile comprising one or more file-level QoS parameters, wherein the QoS profile applies to one or more files associated with a service flow associated with a UE, wherein each file of the one or more files comprises one or more PDUs, and wherein a header of each PDU of the one or more PDUs of the file includes a file identifier and a file type of the file, and enforce the QoS profile on the one or more files.

In an aspect, an apparatus for wireless communication includes a receiver of a network node configured to: receive, from an application server, at least one file of at least one burst of files destined for an application associated with a UE, wherein the at least one file is received in one or more PDUs, and wherein a header of each PDU of the one or more received PDUs includes a file identifier and a file type of the at least one file and a burst identifier of the at least one burst, and a transmitter of the network node configured to: encode the file identifier, the file type, and the burst identifier in headers of each of one or more downlink PDUs, and forward the one or more downlink PDUs to a RAN serving the UE.

In an aspect, an apparatus for wireless communication includes at least one processor of an application server configured to: cause a transmitter of the application server to transmit, to a UPF, at least one file of at least one burst of files destined for an application associated with a UE, wherein the at least one file is transmitted in one or more PDUs, and wherein a header of each PDU of the one or more transmitted PDUs includes a file identifier and a file type of the at least one file and a burst identifier of the at least one burst, determine a file-level QoS profile for the at least one file of the at least one burst, and cause the transmitter to transmit the file-level QoS profile to an SMF.

In an aspect, an apparatus for wireless communication includes a receiver of a UE configured to: receive, from an application associated with the UE, at least one file of at least one burst of files destined for an application server, wherein the at least one file is received in one or more data packets, and wherein a header of each data packet of the one or more received data packets includes a file identifier and a file type of the at least one file and a burst identifier of the at least one burst, and a transmitter of the UE configured to: encode the file identifier, the file type, and the burst identifier in headers of each of one or more uplink data packets, and forward the one or more uplink data packets to a RAN serving the UE.

In an aspect, a network node includes means for configuring a QoS profile comprising one or more file-level QoS parameters, wherein the QoS profile applies to one or more files associated with a service flow associated with a UE, wherein each file of the one or more files comprises one or more PDUs, and wherein a header of each PDU of the one or more PDUs of the file includes a file identifier and a file type of the file, and means for enforcing the QoS profile on the one or more files.

In an aspect, an apparatus for wireless communication includes a means for receiving of a network node configured to: receive, from an application server, at least one file of at least one burst of files destined for an application associated with a UE, wherein the at least one file is received in one or more PDUs, and wherein a header of each PDU of the one or more received PDUs includes a file identifier and a file type of the at least one file and a burst identifier of the at least one burst, and a means for transmitting of the network node configured to: encode the file identifier, the file type, and the burst identifier in headers of each of one or more downlink PDUs, and forward the one or more downlink PDUs to a RAN serving the UE.

In an aspect, an apparatus for wireless communication includes a means for processing of an application server configured to: cause a means for transmitting of the application server to transmit, to a UPF, at least one file of at least one burst of files destined for an application associated with a UE, wherein the at least one file is transmitted in one or more PDUs, and wherein a header of each PDU of the one or more transmitted PDUs includes a file identifier and a file type of the at least one file and a burst identifier of the at least one burst, determine a file-level QoS profile for the at least one file of the at least one burst, and cause the means for transmitting to transmit the file-level QoS profile to an SMF.

In an aspect, an apparatus for wireless communication includes a means for receiving of a UE configured to: receive, from an application associated with the UE, at least one file of at least one burst of files destined for an application server, wherein the at least one file is received in one or more data packets, and wherein a header of each data packet of the one or more received data packets includes a file identifier and a file type of the at least one file and a burst identifier of the at least one burst, and a means for transmitting of the UE configured to: encode the file identifier, the file type, and the burst identifier in headers of each of one or more uplink data packets, and forward the one or more uplink data packets to a RAN serving the UE.

In an aspect, a non-transitory computer-readable medium storing computer-executable instructions includes computer-executable instructions comprising at least one instruction instructing a network node to configure a QoS profile comprising one or more file-level QoS parameters, wherein the QoS profile applies to one or more files associated with a service flow associated with a UE, wherein each file of the one or more files comprises one or more PDUs, and wherein a header of each PDU of the one or more PDUs of the file includes a file identifier and a file type of the file, and at least one instruction instructing the network node to enforce the QoS profile on the one or more files.

In an aspect, a non-transitory computer-readable medium storing computer-executable instructions for wireless communication includes computer-executable instructions comprising at least one instruction instructing a network node to receive, from an application server, at least one file of at least one burst of files destined for an application associated with a UE, wherein the at least one file is received in one or more PDUs, and wherein a header of each PDU of the one or more received PDUs includes a file identifier and a file type of the at least one file and a burst identifier of the at least one burst, at least one instruction instructing the network node to encode the file identifier, the file type, and the burst identifier in headers of each of one or more downlink PDUs, and at least one instruction instructing the network node to forward the one or more downlink PDUs to a RAN serving the UE.

In an aspect, a non-transitory computer-readable medium storing computer-executable instructions for wireless communication includes computer-executable instructions comprising at least one instruction instructing an application server to transmit, to a UPF, at least one file of at least one burst of files destined for an application associated with a UE, wherein the at least one file is transmitted in one or more PDUs, and wherein a header of each PDU of the one or more transmitted PDUs includes a file identifier and a file type of the at least one file and a burst identifier of the at least one burst, at least one instruction instructing the application server to determine a file-level QoS profile for the at least one file of the at least one burst, and at least one instruction instructing the application server to transmit the file-level QoS profile to an SMF.

In an aspect, a non-transitory computer-readable medium storing computer-executable instructions for wireless communication includes computer-executable instructions comprising at least one instruction instructing a UE to receive, from an application associated with the UE, at least one file of at least one burst of files destined for an application server, wherein the at least one file is received in one or more data packets, and wherein a header of each data packet of the one or more received data packets includes a file identifier and a file type of the at least one file and a burst identifier of the at least one burst, at least one instruction instructing the UE to encode the file identifier, the file type, and the burst identifier in headers of each of one or more uplink data packets, and at least one instruction instructing the UE to forward the one or more uplink data packets to a RAN serving the UE.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
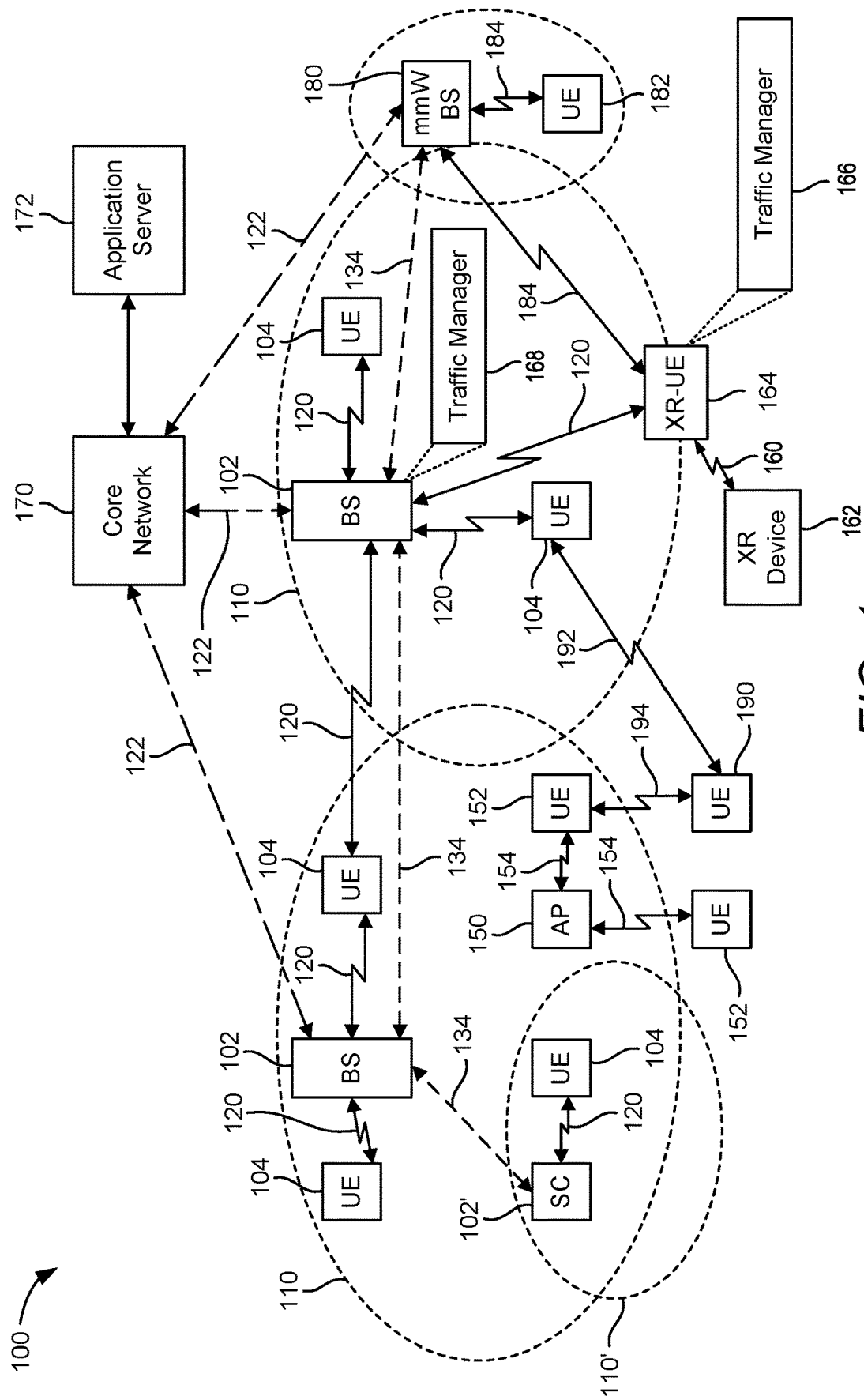
FIG. 1 illustrates an exemplary wireless communications system, according to aspects of the disclosure.

The present disclosure provides techniques for a cellular data network to be "file aware" in order to apply the correct QoS policy to a data flow of files. That is, the disclosed techniques enable the cellular data network to know which packets belong to which file and/or burst of files destined for a particular high bandwidth and/or low latency application associated with a particular UE and to apply the appropriate QoS requirements (e.g., file delay budget, file error rate) to the data flow. For example, when the application server generates a downlink data flow to send to an application client associated with a UE, the application server signals the file identifier, burst identifier, and file type for each file and burst of files in the data flow to the core network. Based on the traffic identifiers from the application server, the core network determines the file-level QoS policy rule(s) for the data flow and sends it/them to the RAN. The RAN then forwards the data flow with the appropriate file-level QoS to the UE, which forwards the files of the data flow to the application client (e.g., an XR application).

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC), a 5G core (5GC), etc.) through backhaul links 122, and through the core network 170 to one or more application servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the core network 170) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include an extended reality (XR) UE 164 that may communicate with a macro cell base station 102 over a communication link 120 and/or the mmW base station 180 over a mmW communication link 184. For example, the macro cell base station 102 may support a PCell and one or more SCells for the XR UE 164 and the mmW base station 180 may support one or more SCells for the XR UE 164. The XR UE 164 may also communicate with an XR device 162 over a D2D P2P link 160. In an aspect, the XR device 162 may be a VR/AR/MR headset or the like.

In an aspect, the XR UE 164 may include a traffic manager 166 that may enable the XR UE 164 to perform the UE operations described herein. Similarly, the base stations 102 may include a traffic manager 168 that may enable the base stations 102 to perform the base station operations described herein. Note that although only one UE in FIG. 1 is illustrated as an XR UE, any of the UEs in FIG. 1 may be configured to perform the UE operations described herein. In addition, although XR UE 164 is referred to as an XR UE, as will be appreciated, this is merely an example and it may be any UE running a high bandwidth low latency application.

Figure 2A:
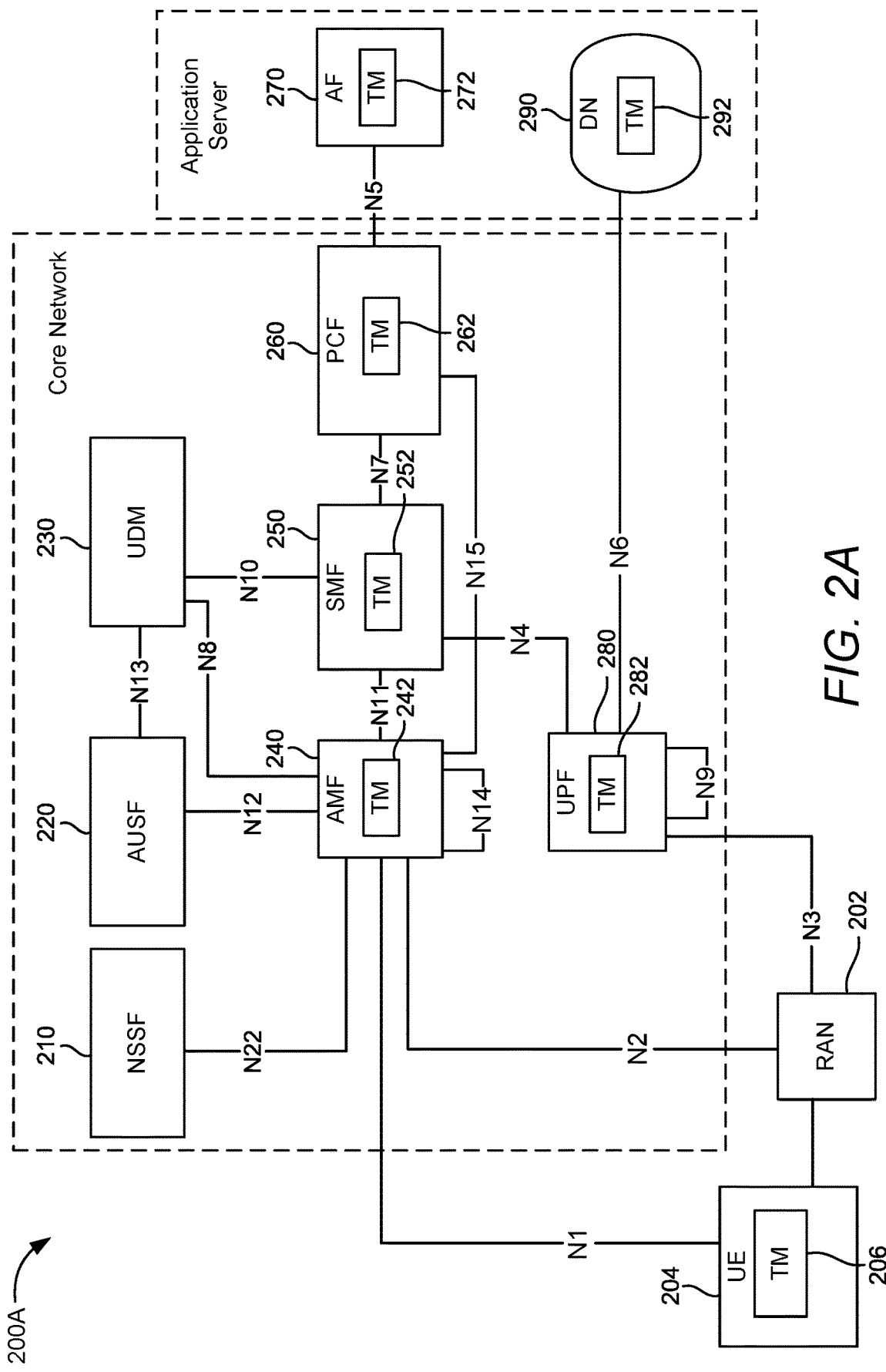
FIGS. 2A and 2B illustrate exemplary system architectures using a reference point representation showing how various network functions interact with each other.

Examples of protocol-specific implementations for the RAN (e.g., base stations 102, etc.) and the core network 170 illustrated in FIG. 1 are provided below with respect to FIGS. 2A and 2B. FIG. 2A illustrates an exemplary system architecture 200A using a reference point representation showing how various network functions interact with each other. The system architecture 200A is illustrated as a 5G system (5GS) architecture. The system architecture 200A may include a UE 204 (which may correspond to any of the UEs described herein) in communication with a RAN 202 (which may be formed by any one or more of the base stations described herein) over a wireless air interface. The UE 204 communicates with an access and mobility management function (AMF) 240 via the RAN 202 over an NAS interface referred to as the N1 interface. An AMF 240 may communicate with other AMFs 240 over an interface referred to as the N14 interface.

The functions of an AMF 240 include registration management, connection management, reachability management, mobility management, lawful interception (for AMF 240 events and interface to the LI system), transport for session management (SM) messages between the UE 204 and the session management function (SMF) 250, transparent proxy services for routing SM messages, access authentication and access authorization, transport for short message service (SMS) messages between the UE 204 and the short message service function (SMSF) (not shown), and security anchor functionality (SEAF). The AMF 240 also interacts with the authentication server function (AUSF) 220 and the UE 204, and receives the intermediate key that was established as a result of the UE 204 authentication process. In the case of authentication based on a UMTS (universal mobile telecommunications system) subscriber identity module (USIM), the AMF 240 retrieves the security material from the AUSF 220. The functions of the AMF 240 also include security context management (SCM). The SCM receives a key from the SEAF that it uses to derive access-network specific keys. The functionality of the AMF 240 also includes location services management for regulatory services, transport for location services messages between the UE 204 and the location management function (LMF) (not shown), as well as between the RAN 202 and the LMF, evolved packet system (EPS) bearer identifier allocation for interworking with the EPS, and UE 204 mobility event notification. In addition, the AMF 240 also supports functionalities for non-3GPP access networks.

In addition to communicating with the AMF 240 over the N2 interface, the RAN 202 also communicates with a user plane function (UPF) 280 over an interface referred to as the N3 interface. Functions of the UPF 280 include acting as an anchor point for intra-/inter-RAT mobility (when applicable), acting as an external protocol data unit (PDU) session point of interconnect to the data network (DN) 290, providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node.

The UPF 280 may communicate with other UPFs 280 over an interface referred to as the N9 interface. The interface over which the UPF 280 communicates with a DN 290 is referred to as the N6 interface. The functions of the DN 290 include operator services, Internet access, and other services.

The interface over which the UPF 280 communicates with an SMF 250 is referred to as the N4 interface. The functions of the SMF 250 include session management, UE Internet protocol (IP) address allocation and management, selection and control of user plane functions, configuration of traffic steering at the UPF 280 to route traffic to the proper destination, control of part of policy enforcement and QoS, and downlink data notification. The interface over which the SMF 250 communicates with an AMF 240 is referred to as the N11 interface.

The interface over which the SMF 250 communicates with a policy control function (PCF) 260 is referred to as the N7 interface. The functions of the PCF 260 include support for a unified policy framework to govern network behavior, provision of policy rules to the control plane function(s) to enforce them, and access to subscription information relevant for policy decisions in a unified data repository (UDR) (not shown). The interface over which the PCF 260 communicates with the AMF 240 is referred to as the N15 interface, and the interface over which the PCF 260 communicates with an application function (AF) 270 is referred to as the N5 interface. The functionality of the AF 270 includes application influence on traffic routing, accessing the network exposure function (NEF) (not shown), and interacting with the policy framework for policy control.

The SMF 250 also communicates with a unified data management (UDM) 230 over an interface referred to as the N10 interface. The functions of the UDM 230 include generation of 3GPP authentication and key agreement (AKA) authentication credentials, user identification handling, support of de-concealment of privacy-protected subscription concealed identifier (SUCI), access authorization based on subscription data (e.g., roaming restrictions), UE's 204 serving network function (NF) registration management (e.g., storing the serving AMF 240 for the UE 204, storing the serving SMF 250 for the UE's 204 PDU session), support for service/session continuity (e.g., by keeping the SMF/DNN (data network name) assignment of ongoing sessions), mobile terminated SMS (MT-SMS) delivery support, lawful interception, subscription management, SMS management, 5G local area network (LAN) group management handling, and support of external parameter provisioning (expected UE 204 behavior parameters or network configuration parameters). The interface over which the UDM 230 communicates with the AMF 240 is referred to as the N8 interface.

The interface over which the UDM 230 communicates with the AUSF 220 is referred to as the N13 interface, and the interface over which the AUSF 220 communicates with the AMF 240 is referred to as the N12 interface. The functionality of the AUSF 220 includes support for authentication for 3GPP access and untrusted non-3GPP access.

The AMF 240 also communicates with a network slice selection function (NSSF) 210 over an interface referred to as the N22 interface. The functionality of the NSSF 210 includes selecting the set of network slice instances serving the UE 204, determining the allowed network slice selection assistance information (NSSAI) and, if needed, the mapping to the subscribed S-NSSAIs, determining the configured NSSAI and, if needed, the mapping to the subscribed S-NSSAIs, and determining the AMF set to be used to serve the UE 204, or, based on configuration, a list of candidate AMF(s) 240, possibly by querying the network repository function (NRF) (not shown). The AMF 240, SMF 250, PCF 260, and AF 270 are control plane functions, and the UPF 280 and DN 290 are user plane functions.

In an aspect, each of the AMF 240, the SMF 250, the PCF 260, the AF 270, the UPF 280, and the DN 290 may include a traffic manager (TM) 242, 252, 262, 272, 282, and 292, respectively, that enable the AMF 240, the SMF 250, the PCF 260, the AF 270, the UPF 280, and the DN 290 to perform the respective operations described herein. Similarly, the UE 204 may include a traffic manager (TM) 206, which may correspond to the traffic manager 166 in FIG. 1, that may enable the UE 204 to perform the UE operations described herein. Similarly, the base stations of the RAN 202 (not shown) may each include a traffic manager, such as traffic manager 168 in FIG. 1, that may enable the base stations to perform the base station operations described herein.

As illustrated by the dashed lines in FIG. 2A, the network functions of the AF 270 and the DN 290 make up, or are referred to as, an application server, and may be a specific example of the application server 172 in FIG. 1. The network functions of the NSSF 210, the AUSF 220, the UDM 230, the AMF 240, the SMF 250, the PCF 260, and the UPF 280 make up the core network, referred to in 5G as the 5G core (5GC), and may be a specific example of the core network 170 in FIG. 1. The various network functions illustrated in FIG. 2A may be distributed over separate devices (e.g., servers), or may be logically separated on the same device.

For the sake of clarity, the unstructured data storage function (UDSF), the NEF, and the NRF have not been illustrated. However, all illustrated network functions can interact with the UDSF, UDR, NEF, and NRF as necessary. The UDM 230 uses subscription data and authentication data and the PCF 260 uses policy data that may be stored in the UDR. For clarity, the UDR and its connections with other network functions (e.g., PCF 260) are not illustrated. In addition, for clarity, the network data analytics function (NWDAF) and its connections with other network functions are not illustrated in FIG. 2A.

Figure 2B:
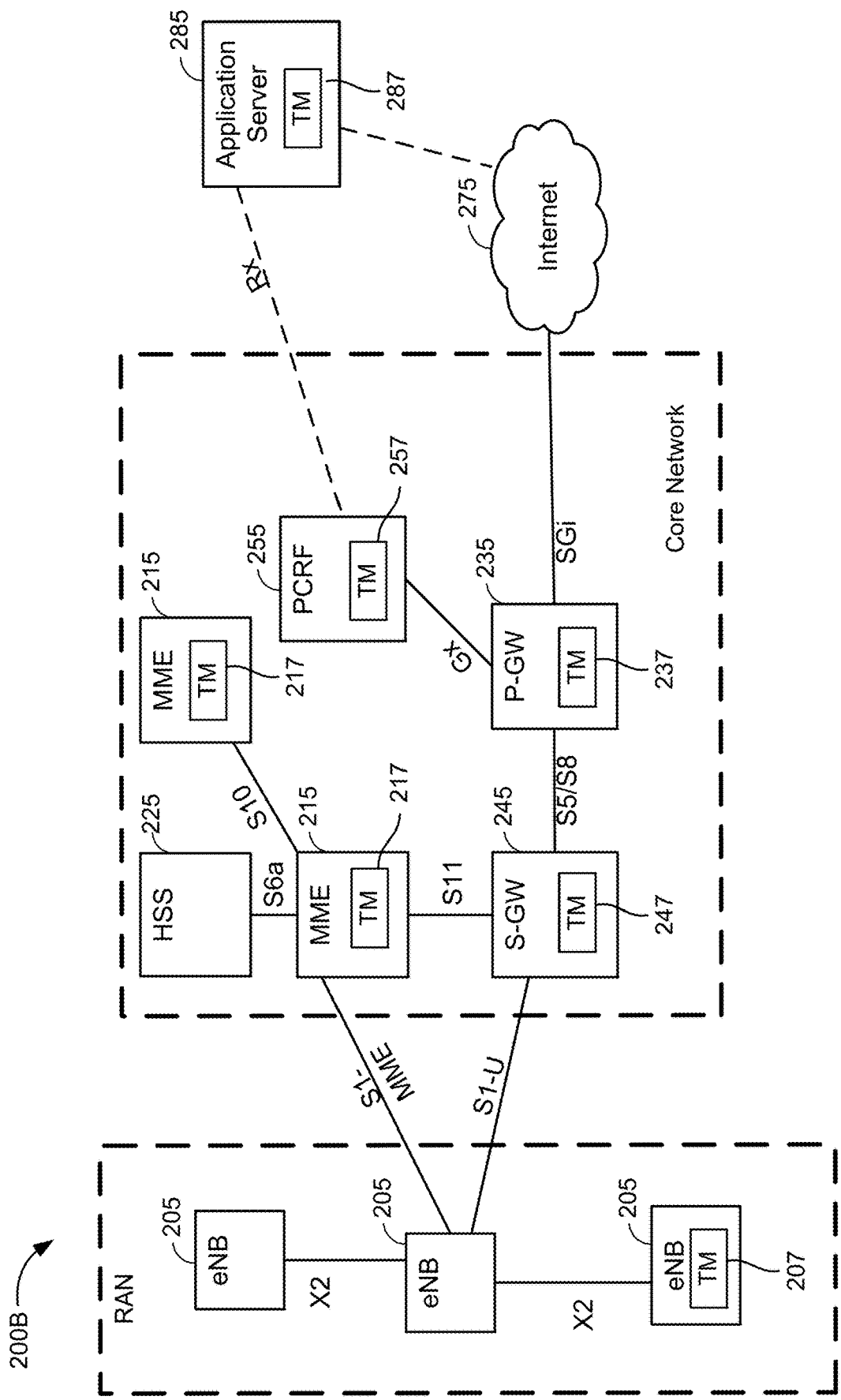

FIG. 2B illustrates another exemplary system architecture 200B using a reference point representation showing how various network functions interact with each other. The system architecture 200B is illustrated as an LTE system architecture. Referring to FIG. 2B, the RAN includes a plurality of eNBs 205, which may be examples of the base stations illustrated in FIG. 1.

In FIG. 2B, the core network includes a plurality of mobility management entities (MMEs) 215, a home subscriber server (HSS) 225, a serving gateway (S-GW) 245, a packet data network gateway (P-GW) 235, and a policy and charging rules function (PCRF) 255. Network interfaces between these components, the RAN, and the Internet 275 are illustrated in FIG. 2B and are defined in Table 1 (below) as follows:

TABLE 1

| Network Interface | Description |
| --- | --- |
| S1-MME | Reference point for the control plane protocol between the RAN and the MME 215. |
| S1-U | Reference point between the RAN and the S-GW 245 for the per bearer user plane tunneling and inter-eNodeB path switching during handover. |
| S5 | Provides user plane tunneling and tunnel management between the S-GW 245 and the P-GW 235. It is used for S-GW relocation due to UE mobility and if the |

TABLE 1-continued

| Network Interface | Description |
| --- | --- |
| | S-GW 245 needs to connect to a non-collocated P-GW for the required PDN connectivity. |
| S6a | Enables transfer of subscription and authentication data for authenticating/authorizing user access to the evolved system (Authentication, Authorization, and Accounting (AAA) interface) between the MME 215 and the HSS 225. |
| Gx | Provides transfer of QoS policy and charging rules from PCRF 255 to the policy and charging enforcement function (PCEF) component (not shown) in the P-GW 235. |
| S8 | Inter-PLMN reference point providing user and control plane between the S-GW 245 in a visited public land mobile network (VPLMN) and the P-GW 235 in a home public land mobile network (HPLMN). S8 is the inter-PLMN variant of S5. |
| S10 | Reference point between MMEs 215 for MME relocation and MME to MME information transfer. |
| S11 | Reference point between the MME 215 and the S-GW 245. |
| SGi | Reference point between the P-GW 235 and the packet data network, shown in FIG. 2B as the Internet 275. The packet data network may be an operator external public or private packet data network or an intra-operator packet data network (e.g., for provision of IMS services). This reference point corresponds to Gi for 3GPP accesses. |
| X2 | Reference point between two different eNodeBs used for UE handoffs. |
| Rx | Reference point between the PCRF 255 and an application function (AF) that is used to exchanged application-level session information, where the AF is represented in FIG. 2B by the application server 285. |

A high-level description of the components shown in the RAN and core network of FIG. 2B will now be described. However, these components are each well-known in the art from various 3GPP standards, and the description contained herein is not intended to be an exhaustive description of all functionalities performed by these components.

Referring to FIG. 2B, the MMEs 215 are configured to manage the control plane signaling for the EPS bearers. MME functions include: NAS signaling, NAS signaling security, mobility management for inter- and intra-technology handovers, P-GW and S-GW selection, and MME selection for handovers with MME change.

Referring to FIG. 2B, the S-GW 245 is the gateway that terminates the interface toward the RAN. For each UE associated with the core network for an LTE-based system, at a given point of time, there is a single S-GW. The functions of the S-GW 245, for both the GTP-based and the proxy mobile IPv6 (PMIP)-based S5/S8, include: mobility anchor point, packet routing and forwarding, and setting the DiffServ Code Point (DSCP) based on a QoS class identifier (QCI) of the associated EPS bearer.

Referring to FIG. 2B, the P-GW 235 is the gateway that terminates the SGi interface toward the packet data network (PDN), for example, the Internet 275. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: packet filtering (by deep packet inspection), UE IP address allocation, setting the DSCP based on the QCI of the associated EPS bearer, accounting for inter operator charging, uplink and downlink bearer binding, and uplink bearer binding verification. The P-GW 235 provides PDN connectivity to different types of UEs.

Referring to FIG. 2B, the PCRF 255 is the policy and charging control element of the LTE-based core network. In a non-roaming scenario, there is a single PCRF in the HPLMN associated with a UE's Internet protocol connectivity access network (IP-CAN) session. The PCRF 255 terminates the Rx interface and the Gx interface. In a roaming scenario with local breakout of traffic, there may be two PCRFs associated with a UE's IP-CAN session: a home PCRF (H-PCRF) is a PCRF that resides within a HPLMN, and a visited PCRF (V-PCRF) is a PCRF that resides within a visited VPLMN.

In FIG. 2B, the application server 285 (e.g., which can be referred to as the AF in 3GPP terminology) is shown as connected to the core network via the Internet 275, or alternatively to the PCRF 255 directly via an Rx interface. Generally, the application server 285 (or AF) is an element offering applications that use IP bearer resources with the core network (e.g. UMTS PS domain/GPRS domain resources/LTE PS data services). One example of an application function is the proxy-call session control function (P-CSCF) of the IP multimedia subsystem (IMS) core network sub system. The AF uses the Rx reference point to provide session information to the PCRF 255. Any other application server offering IP data services over cellular network can also be connected to the PCRF 255 via the Rx reference point.

In an aspect, each of the MME 215, the S-GW 245, the P-GW 235, the PCRF 255, and the application server 285 may include a traffic manager (TM) 217, 247, 237, 257, and 287, respectively, that enable the MME 215, the S-GW 245, the P-GW 235, the PCRF 255, and the application server 285 to perform the respective operations described herein. Similarly, the eNBs 205 may each include a traffic manager 207 (although only one is shown), such as traffic manager 168 in FIG. 1, that may enable the eNBs 205 to perform the base station operations described herein.

Note that while FIGS. 2A and 2B have described 5G and LTE (4G) system architectures, the disclosure is not limited to 5G or LTE, and may instead apply to any generation of system architecture capable of supporting the functionality described herein. Further note that the functionality of the MME 215, the S-GW 245, and the P-GW 235 in FIG. 2B corresponds to the functionality of the SMF 250, AMF 240, and UPF 280 in FIG. 2A.

Figure 3:
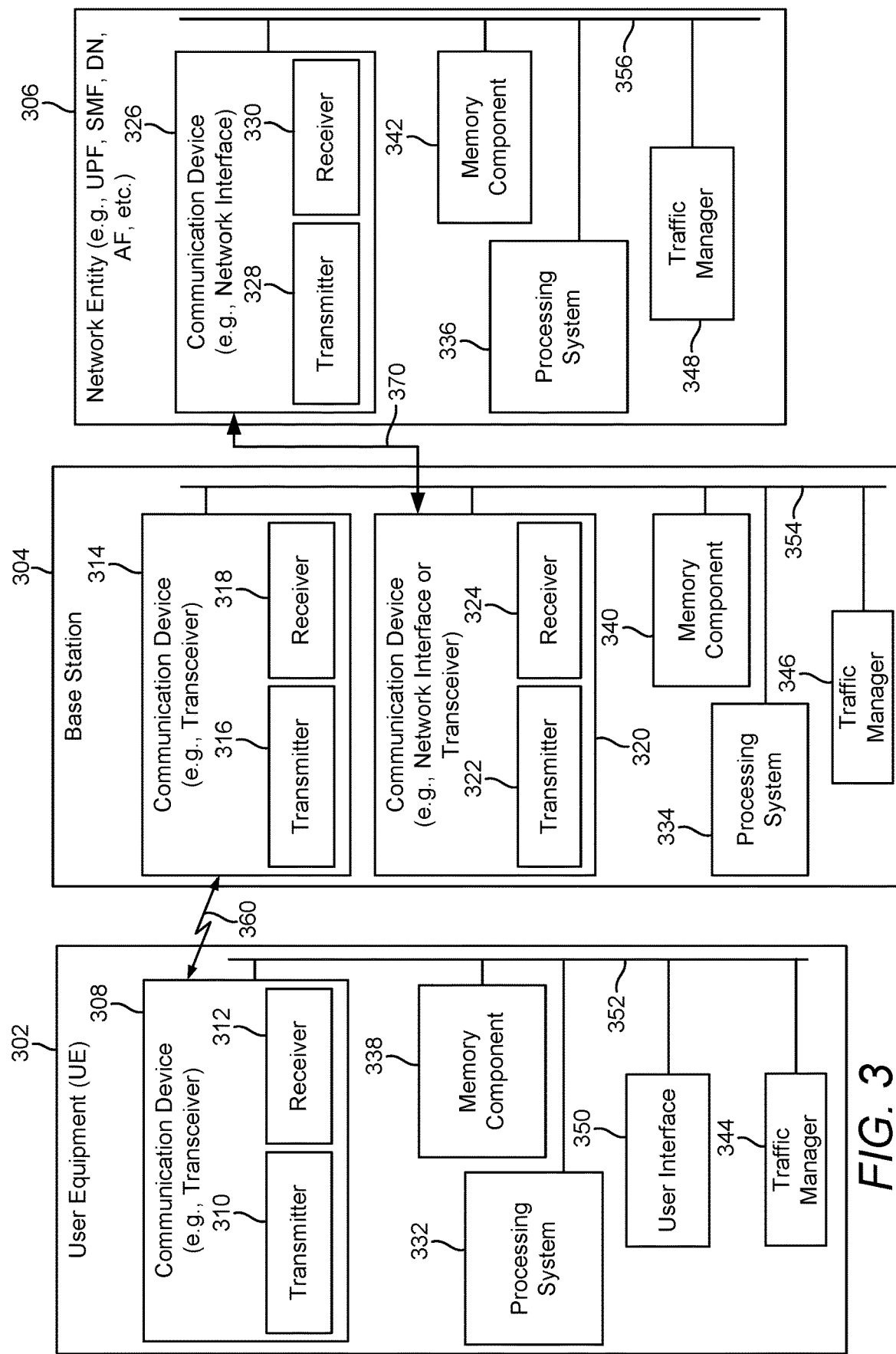
FIG. 3 is a simplified block diagram of several sample aspects of components that may be employed in communication nodes and configured to support communication as taught herein.

FIG. 3 illustrates several sample components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include at least one wireless communication device (represented by the communication devices 308 and 314 (and the communication device 320 if the apparatus 304 is a relay)) for communicating with other nodes via at least one designated RAT. For example, the communication devices 308 and 314 may communicate with each other over a wireless communication link 360, which may correspond to a communication link 120 in FIG. 1. Each communication device 308 includes at least one transmitter (represented by the transmitter 310) for transmitting and encoding signals (e.g., messages, indications, information, and so on) and at least one receiver (represented by the receiver 312) for receiving and decoding signals (e.g., messages, indications, information, pilots, and so on). Similarly, each communication device 314 includes at least one transmitter (represented by the transmitter 316) for transmitting signals (e.g., messages, indications, information, pilots, and so on) and at least one receiver (represented by the receiver 318) for receiving signals (e.g., messages, indications, information, and so on). If the base station 304 is a relay station, each communication device 320 may include at least one transmitter (represented by the transmitter 322) for transmitting signals (e.g., messages, indications, information, pilots, and so on) and at least one receiver (represented by the receiver 324) for receiving signals (e.g., messages, indications, information, and so on).

A transmitter and a receiver may comprise an integrated device (e.g., embodied as a transmitter circuit and a receiver circuit of a single communication device, generally referred to as a "transceiver") in some implementations, may comprise a separate transmitter device and a separate receiver device in some implementations, or may be embodied in other ways in other implementations. A wireless communication device (e.g., one of multiple wireless communication devices) of the base station 304 may also comprise a network listen module (NLM) or the like for performing various measurements.

The network entity 306 (and the base station 304 if it is not a relay station) includes at least one communication device (represented by the communication device 326 and, optionally, 320) for communicating with other nodes. For example, the communication device 326 may comprise a network interface that is configured to communicate with one or more network entities via a wire-based or wireless backhaul 370 (which may correspond to the backhaul link 122 in FIG. 1). In some aspects, the communication device 326 may be implemented as a transceiver configured to support wire-based or wireless signal communication. This communication may involve, for example, sending and receiving: messages, parameters, or other types of information. Accordingly, in the example of FIG. 3, the communication device 326 is shown as comprising a transmitter 328 and a receiver 330. Similarly, if the base station 304 is not a relay station, the communication device 320 may comprise a network interface that is configured to communicate with one or more network entities 306 via a wire-based or wireless backhaul 370. As with the communication device 326, the communication device 320 is shown as comprising a transmitter 322 and a receiver 324.

The apparatuses 302, 304, and 306 also include other components that may be used in conjunction with the file transmission operations as disclosed herein. The UE 302 includes a processing system 332 for providing functionality relating to, for example, the UE operations as described herein and for providing other processing functionality. The base station 304 includes a processing system 334 for providing functionality relating to, for example, the base station operations described herein and for providing other processing functionality. The network entity 306 includes a processing system 336 for providing functionality relating to, for example, the network function operations described herein and for providing other processing functionality. The apparatuses 302, 304, and 306 include memory components 338, 340, and 342 (e.g., each including a memory device), respectively, for maintaining information (e.g., information indicative of reserved resources, thresholds, parameters, and so on). In addition, the UE 302 includes a user interface 350 for providing indications (e.g., audible and/or visual indications) to a user and/or for receiving user input (e.g., upon user actuation of a sensing device such a keypad, a touch screen, a microphone, and so on). Although not shown, the apparatuses 304 and 306 may also include user interfaces.

In an aspect, the apparatuses 302, 304, and 306 may include traffic managers 344, 346, and 348, respectively. The traffic managers 344, 346, and 348 may be hardware circuits that are part of or coupled to the processing systems 332, 334, and 336, respectively, that, when executed, cause the apparatuses 302, 304, and 306 to perform the functionality described herein. Alternatively, the traffic managers 344, 346, and 348 may be memory modules stored in the memory components 338, 340, and 342, respectively, that, when executed by the processing systems 332, 334, and 336, cause the apparatuses 302, 304, and 306 to perform the functionality described herein.

For convenience, the apparatuses 302, 304, and/or 306 are shown in FIG. 3 as including various components that may be configured according to the various examples described herein. It will be appreciated, however, that the illustrated blocks may have different functionality in different designs.

The various components of the apparatuses 302, 304, and 306 may communicate with each other over data buses 352, 354, and 356, respectively. The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 308, 332, 338, 344, and 350 may be implemented by processor and memory component(s) of the UE 302 (e.g., by execution of appropriate code and/or by appropriate configuration of processor components). Similarly, some or all of the functionality represented by blocks 314, 320, 334, 340, and 346 may be implemented by processor and memory component(s) of the base station 304 (e.g., by execution of appropriate code and/or by appropriate configuration of processor components). Also, some or all of the functionality represented by blocks 326, 336, 342, and 348 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE, base station, network entity, etc., such as the processing systems 332, 334, 336, the communication devices 308, 314, 326, the traffic managers 344, 348, etc.

Extended reality (XR) refers to all real-and-virtual combined environments and human-machine interactions generated by computer technology and wearables. It includes representative forms such as augmented reality (AR), augmented virtuality (AV), mixed reality (MR), and virtual reality (VR) and the areas interpolated among them.

VR is a rendered version of a visual (and optionally, audio) scene. The rendering is designed to mimic the visual (and audio) sensory stimuli of the real world as naturally as possible to an observer or user as they move within the limits defined by the VR application. VR usually, but not necessarily, requires a user to wear a head mounted display (HMD) (an example of XR device 162), to completely replace the user's field of view with a simulated visual component, and to wear headphones, to provide the user with the accompanying audio. Some form of head and motion tracking of the user in VR is usually also necessary to allow the simulated visual and audio components to be updated in order to ensure that, from the user's perspective, items and sound sources remain consistent with the user's movements. Additional means to interact with the virtual reality simulation may be provided but are not strictly necessary.

AR is when a user is provided with additional information or artificially generated items or content that are overlaid upon his or her current environment, usually in the form of a heads-up display (HUD) integrated into a pair of glasses (another example of XR device 162). Such additional information or content will usually be visual and/or audible and the user's observation of the current environment may be direct, with no intermediate sensing, processing, and rendering, or indirect, where the user's perception of the environment is relayed via sensors and may be enhanced or processed.

MR is an advanced form of AR, where some virtual elements are inserted into the physical scene with the intent to provide the illusion that these elements are part of the real scene.

XR refers to all real-and-virtual combined environments and human-machine interactions generated by computer technology and wearables. It includes representative forms, such as AR, MR, and VR, and the areas interpolated among them. The levels of virtuality range from partial sensory inputs to fully immersive VR. A key aspect of XR is the extension of human experiences, especially relating to the senses of existence (represented by VR) and the acquisition of cognition (represented by AR).

There are a number of challenges to designing and building XR devices. One of these challenges is connectivity. XR devices need to provide ubiquitous, wireless connectivity for anywhere usage at fiber-optic speeds. This type of high data rate and low latency network connectivity can now be achieved over cellular networks, due to the increased speeds and reduced latency offered by 5G networks.

For example, 5G networks allow for extremely high throughput (e.g., multi Gbps), ultra-low latency (e.g., down to 1 ms), and a uniform experience, even at the cell edge. Video is expected to be the primary use case for 5G connectivity. Current LTE networks can provide a throughput of approximately 10 to 50 Mbps, which allows for up to 360°, 4K resolution, 30 frames per second (fps) video. In contrast, 5G networks will be able to provide a throughput of approximately 200 to 5000 Mbps with very low latency, which can allow for interactive, real-time three-dimensional (3D) "free-viewpoint" (i.e., six degrees of freedom (6-DoF)), 8K resolution, 90-120 fps, high-dynamic-range (HDR) video.

5G QoS indicators (5QI) have been specified for services that are assumed to be frequently used and thus benefit from optimized signaling by using standardized QoS characteristics. Dynamically assigned 5QI values (which require a signaling of QoS characteristics as part of the QoS profile) can be used for services for which standardized 5QI values are not defined. Some of the one-to-one mappings of standardized 5QI values to 5G QoS characteristics are specified in Table 2.

TABLE 2

| 5QI Value | Packet Delay Budget (PDB) | Packet Error Rate (PER) | Default Maximum Data Burst Volume | Example Services |
|---|---|---|---|---|
| 1 | 100 ms | $10^{-2}$ | N/A | Conversational Voice |
| 2 | 150 ms | $10^{-3}$ | N/A | Conversational Video (Live Streaming) |
| 6, 8, 9 | 300 ms | $10^{-6}$ | N/A | Video (Buffered Streaming) TCP-based (e.g., www, e-mail, chat, ftp, P2P file sharing, progressive video, etc.) |
| ... | ... | ... | ... | ... |
| 80 | 10 ms | $10^{-6}$ | N/A | Low Latency eMBB applications Augmented Reality |
| 81 | 5 ms | $10^{-5}$ | 160 B | Remote control |
| ... | | | ... | ... |

XR applications require a high bit rate, high reliability (e.g., a PER less than or equal to $10^{-3}$), and low latency (e.g., a PDB between 5 ms and 25 ms) wireless connectivity. As such, XR applications would benefit from a 5QI of 80 or higher.

Table 3 illustrates exemplary XR use cases that would require high bit rate, high reliability, and low latency connectivity:

TABLE 3

| | Cloud Gaming | VR split rendering | AR split computation |
|---|---|---|---|
| HMD/Device | 5G Smartphone or Tablet | Head-mounted with 5G modem attached | Head-mounted USB/Bluetooth connection to "puck" or Smartphone with 5G modem. Low power (2 W) AR glasses |
| 5G usage | QoS/Over the Top (OTT) | QOS | QOS |
| Location | Outdoor | Enterprise-Indoor, Residential-Indoor, Outdoor | Enterprise-Indoor, Outdoor |
| Mobility | Static, Hi-speed | Limited to head movements and restricted body movements, Hi-speed (VR in a train, back of a car) | Pedestrian, Hi-speed |

Figure 4:
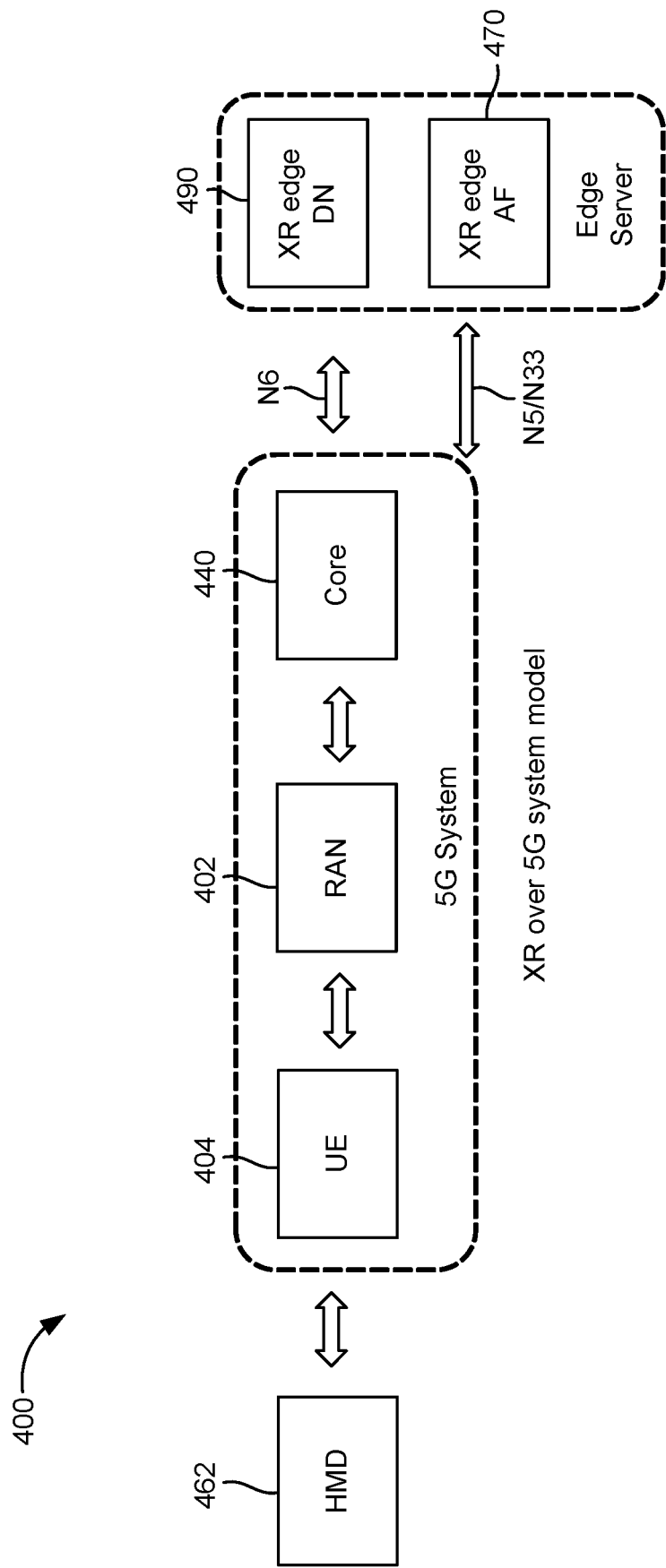
FIG. 4 illustrates an exemplary system model, according to aspects of the disclosure.

FIG. 4 illustrates an exemplary XR-over-5G system model 400, according to aspects of the disclosure. The XR-over-5G system model 400 includes an HMD 462 (or any other type of XR device) in communication with a UE 404 over a wired or wireless link. The UE 404 is connected to a RAN 402 (which may correspond to RAN 202 in FIG. 2A), which is connected to a core network 440 (which may correspond to the core network illustrated in FIG. 2A). The core network 440 is connected to an XR edge DN 490 (which may correspond to the DN 290 in FIG. 2A) over an N6 interface (the interface between a UPF and a DN). The core network 440 is also connected to an XR edge AF 470 (which may correspond to the AF 270 in FIG. 2A) over network external interfaces referred to as the N5 and N33 interfaces. Note that although FIG. 4 illustrates an XR-over-5G system model 400, the disclosure is not limited to XR or 5G, and a similar model may apply for other types of high bandwidth low latency application traffic over a cellular system, such as LTE or other cellular generation.

The present disclosure makes certain assumptions about an XR-over-5G system, such as XR-over-5G system model 400. One assumption is that the 5G system provides QoS (it is not "over the top"). Another is that the XR application session is hosted at the edge server (i.e., the XR edge DN 490 and the XR edge AF 470). Yet another is that the latency between the core network 440 and the XR edge server is assumed to be negligible. Another assumption is that the transport layer over the N6 interface will utilize the real-time transport protocol (RTP) at the application layer and the user datagram protocol (UDP) at the transport layer. It is also assumed that use of the hypertext transfer protocol (HTTP) at the application layer and of the transmission control protocol (TCP) at the transport layer will cut into the latency budget. There is no assumption, however, about the ownership of the edge server—it could be owned by the network operator or a third party.

An issue with transporting XR application traffic over a 5G network is that XR applications specify the requirements for files rather than packets. Specifically, XR applications specify the file error rate (FER) and/or the file delay budget (FDB). In addition, the file handling policy may specify that a file can be used only if all packets of a file are received, or that a contiguous stream of packets up to the first packet in error can be used. However, cellular data networks, including 5G systems, are only aware of packet requirements via the packet error rate (PER) and the packet delay budget (PDB). This includes transmission and retransmission schemes, which are performed at the packet level, not the file level. Accordingly, the present disclosure provides techniques for file-based transmission and retransmission of application files in a 5G system, or any other cellular data network that can support the requirements of the traffic flow. The disclosed techniques are also applicable to packet group-based transmission and retransmission.

The present disclosure provides techniques for a cellular data network, such as a 5G system, to be "file aware" in order to apply the correct QoS policy to a data flow of files. That is, the disclosed techniques enable a cellular data network to know which packets belong to which file and/or burst of files destined for a particular high bandwidth and/or low latency application associated with a particular UE, such as an XR application, and to apply the appropriate QoS requirements to the data flow.

Note that a file is a set of one or more data packets (e.g., RLC PDUs, PDCP PDUs) that is jointly processed by an application, such as an XR application. A file is broken into Internet protocol (IP) packets depending on the maximum transmission unit (MTU) settings on the IP stack interfacing with the XR application. The IP packets can be fragmented into IP packet fragments.

Figure 5:
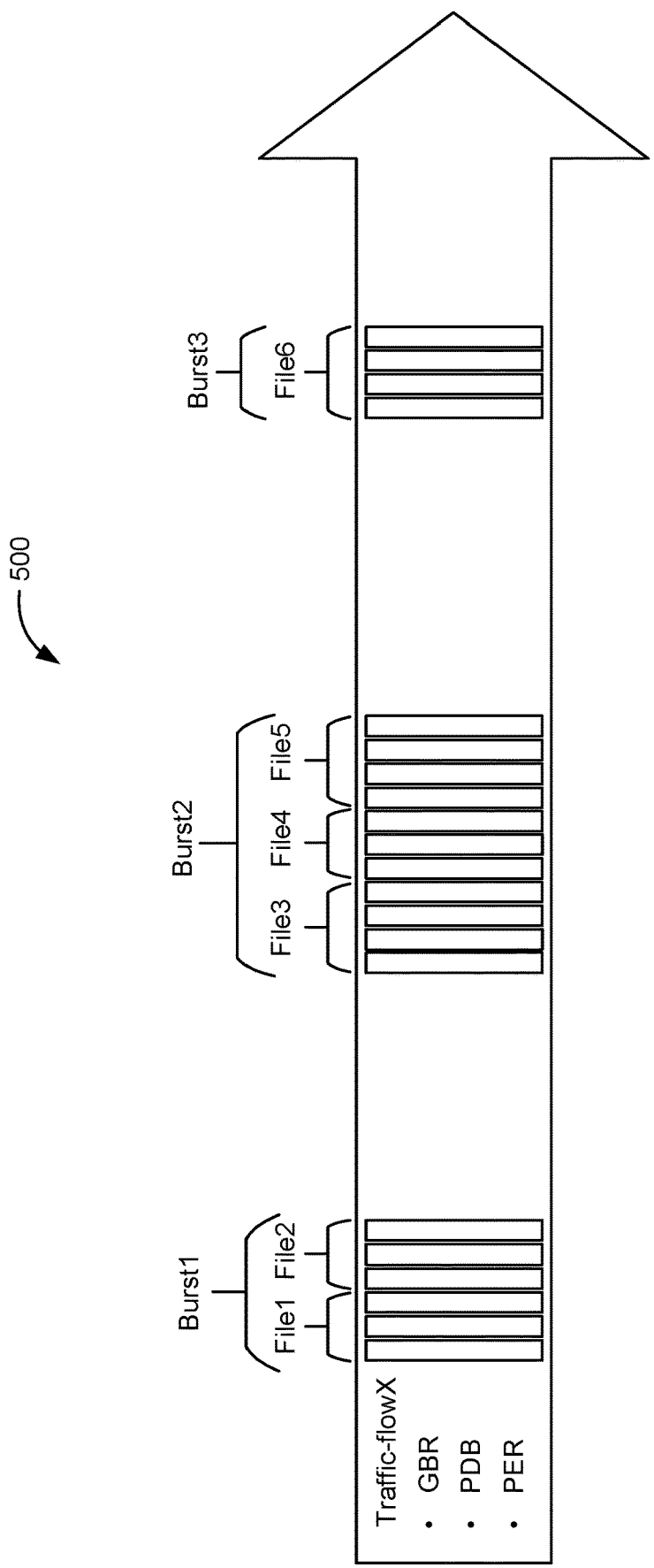
FIG. 5 illustrates an exemplary data flow, according to aspects of the disclosure.

FIG. 5 illustrates an exemplary data flow 500, according to aspects of the disclosure. As shown in FIG. 5, the data flow 500 includes a plurality of bursts of files (labeled "Burst1," "Burst2," and "Burst3"), each comprising one or more files destined for an application (labeled "File1" to "File6"). Each file is comprised of one or more packets (three or four in the example of FIG. 5). The application may be an XR application or any other application requiring high bandwidth and/or low latency, such as video and HTTP streaming applications.

Packets for XR application files are typically carried over UDP and radio link control unacknowledged mode (RLC- UM), as this is more efficient than using RLC-AM (acknowledge mode). Because XR applications specify the requirements for files rather than packets, file level retransmission is important to ensure the service quality for the XR application.

Figure 6:
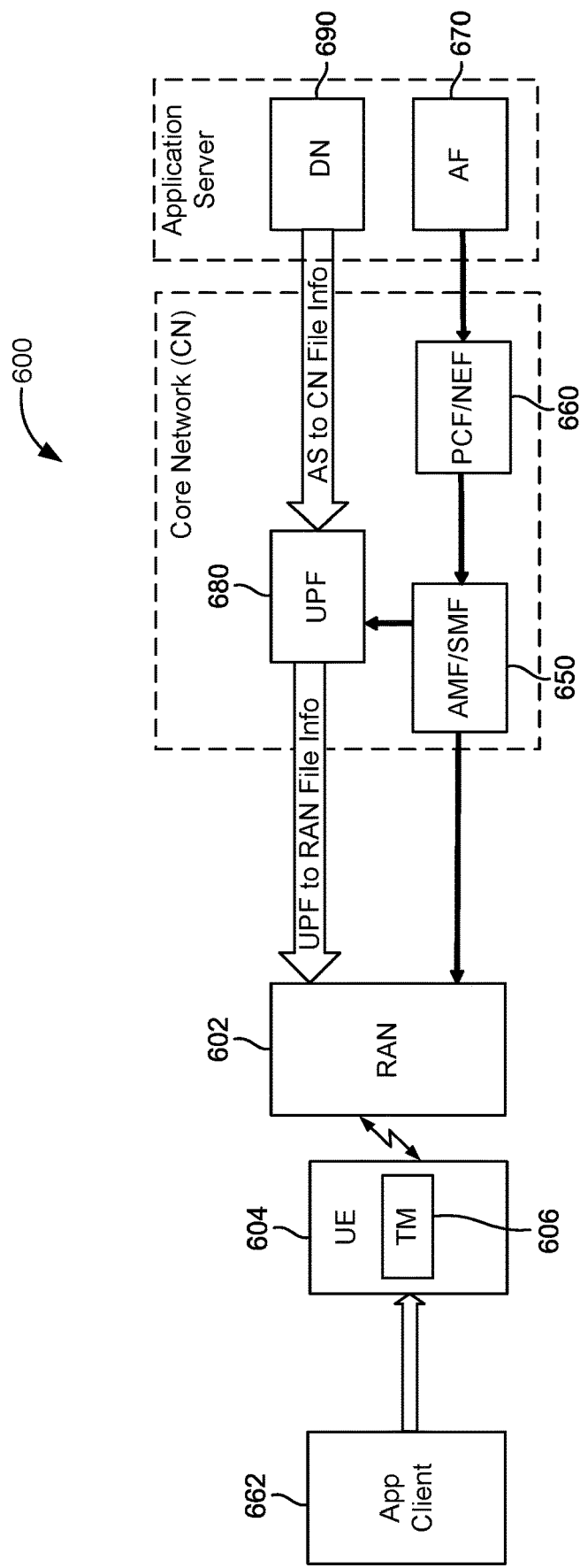
FIG. 6 illustrates an exemplary traffic-aware system architecture, according to aspects of the disclosure.

FIG. 6 illustrates an exemplary traffic-aware system architecture 600, according to aspects of the disclosure. The system architecture 600 may be, for example, a 5G system architecture; however, as noted above, the disclosure is not limited to 5G. When the application server (i.e., the AF 670 and the DN 690) generates a downlink data flow (e.g., data flow 500) to send to an application client 662 associated with a UE 604 (e.g., an XR application running on the UE 604 or an XR device connected to the UE 604, such as XR device 162), the application server signals the file identifier, burst identifier, and file type (collectively referred to as "file information," "traffic identifiers," or the like) for each file and burst of files in the data flow to the core network (e.g., the core network illustrated in FIG. 2A or 2B). Specifically, the DN 690 (which may correspond to the DN 290 in FIG. 2A or the application server 285 in FIG. 2B) signals the traffic identifiers to the UPF 680 (which may correspond to the UPF 280 in FIG. 2A) over the user plane N6 interface, in addition to the data flow itself. The AF 670 (which may correspond to AF 270 in FIG. 2A or the application server 285 in FIG. 2B) signals the traffic identifiers to the PCF/NEF 660 (which may correspond to PCF 260 in FIG. 2A) over the control plane N5 interface. The traffic identifiers can be indicated by the application server via the UDP/TCP port or an IPv6 flow label. For example, the 20-bit IPv6 flow label can include the file identifier and the file type. Alternatively or additionally, the application server can use the fragmentation unit header in the RTP packets of the data flow to convey the traffic identifiers to the UPF 680 and the PCF/NEF 660.

Based on the traffic identifiers from the AF 670, the PCF/NEF 660 determines the file-level QoS policy rule(s) (i.e., a file-level QoS profile) for the data flow and provides it/them to the AMF/SMF 650 (which may correspond to AMF 240 and SMF 250 in FIG. 2A) over the N7 interface. The AMF/SMF 650 determines the downlink FDB and FER for the data flow based on the file-level QoS policy rule(s) from the PCF/NEF 660. The AMF/SMF 650 then sends the FDB and FER (i.e., file-level QoS parameters of the file-level QoS profile) to the RAN 602 (which may correspond to RAN 202 in FIG. 2A) in, for example, PDU Session Setup or Session Modification procedures.

In an aspect, the AMF/SMF 650 sends the file-level QoS policy rule(s) and any other needed file detection information to the UPF 680. Alternatively, the UPF 680 may receive the file detection information from an operations, administration, and maintenance (OAM) function (not shown). The UPF 680 receiving the data flow and the file information for the data flow may be considered as the UPF 680 configuring a QoS profile for the data flow. The UPF 680 then sends the data flow and the file information for the data flow to the RAN 602 serving the UE 604. The UPF 680 includes the file identifier, the burst identifier, and the file type of each file in the data flow in the general packet radio service (GPRS) tunneling protocol (GTP) user plane (GTP-U) header of the downlink PDUs of the data flow. The UPF 680 encoding the traffic identifiers and forwarding the data flow to the RAN 602 may be considered as the UPF 680 enforcing the QoS profile on the data flow.

The RAN 602 receiving the FDB and FER (i.e., QoS parameters of the QoS profile) from the AMF/SMF 650 may be considered as the RAN 602 configuring a QoS profile.

The RAN 602 then forwards the data flow with the appropriate file-level QoS to the UE 604, which forwards the files of the data flow to the application client 662. The RAN 602 transmitting the QoS profile to the UE 604 may be considered as the RAN 602 enforcing the QoS profile.

The foregoing description of FIG. 6 described downlink file transmission, that is, file transmission from the application server through the core network and the RAN 602 to the UE 604 and then to the application client 662. However, files may also be transmitted from the application client 662 to the UE 604 through the core network to the application server, that is, in the uplink direction. In this case, the application client 662 sends one or more files in one or more bursts to the UE 604 (specifically the modem of the UE 604). The UE 604 may include a traffic manager 606, which may correspond to any of the UE traffic managers described above, and may enable the UE 604 to perform the UE operations described herein. The files may be encoded in one or more data packets (e.g., PDUs). The UE 604 (e.g., the traffic manager 606) may detect the file identifier, burst identifier, and file type of each of the one or more files of the one or more bursts from the UDP/TCP port number and/or IPv6 flow label of the packets, similar to how the UPF 680 does so for a downlink data flow. Alternatively or additionally, the UE 604 may receive the traffic identifiers from the application client 662 in the fragmentation unit (FU) header in the RTP packets of the data flow.

Before forwarding the uplink data flow from the application client 662 to the RAN 602, the UE 604 (e.g., the traffic manager 606) encodes the file identifier, burst identifier, and file type into the headers of the uplink data packets (e.g., RLC/PDCP headers of uplink PDUs) that it sends to the RAN 602. The reason for this is that in 5G, the UE 604 (for uplink packets) and the UPF 680 (for downlink packets) are the two entities that can inspect IP headers (e.g., UDP/TCP, IPv6)—the RAN 602 does not. As such, the UE 604 needs to convey the traffic identifiers as additional bits in the RLC/PDCP headers of the uplink data packets so that it is detectable by other network entities. More specifically, the base stations of the RAN 602 only process the Layer 2 (L2) protocol layer (e.g., the medium access control (MAC) layer). The Layer 3 (L3) protocol layer (e.g., the IP layer) and above are transparent to the RAN 602. As such, the UE 604 needs to identify the QoS flow, file identifier, burst identifier, and file type from the IP layer and above and then include the relevant information in the uplink PDU headers, for example, the service data adaptation protocol (SDAP) headers, RLC headers, and/or PDCP headers. This results in some redundancy, insofar as the traffic identifiers are conveyed in the IP header as well as in the SDAP/PDCP/RLC headers of the uplink data packets.

The UE 604 needs to know how to identify the traffic identifiers in the data flow received from the application client 662. To this end, the SMF sends traffic detection rules to the AMF, collectively the AMF/SMF 650, which sends them (over the RAN 602) to the UE 604 via NAS signaling. The SMF determines the uplink FDB and FER for the data flow based on the file-level QoS policy rules from the PCF/NEF 660, the same as for a downlink data flow. The SMF then sends the FDB and FER to the UE 604 via NAS signaling. The UE 604 can then detect the traffic identifiers in the IP headers of the uplink packets from the application client 662 and encode that information in the PDCP/RLC/SDAP headers of the uplink packets destined for the application server. The core network can process the data flow the same as described for a downlink data flow, except that the data flow is transmitted in the opposite direction (uplink).

In order for the application server (specifically the AF 670) to know how the application client 662 is encoding the traffic identifiers in the IP headers of the uplink data packets and therefore generate the traffic detection rules, the application client 662 and the AF 670 need to have previously exchanged this information either offline or via a generic 5G traffic flow, for example, using session setup information. The application-specific traffic flow is then set up with all the downlink traffic identifiers conveyed to the UPF 680 and all the uplink traffic identifiers conveyed to the UE 604.

Figure 7:
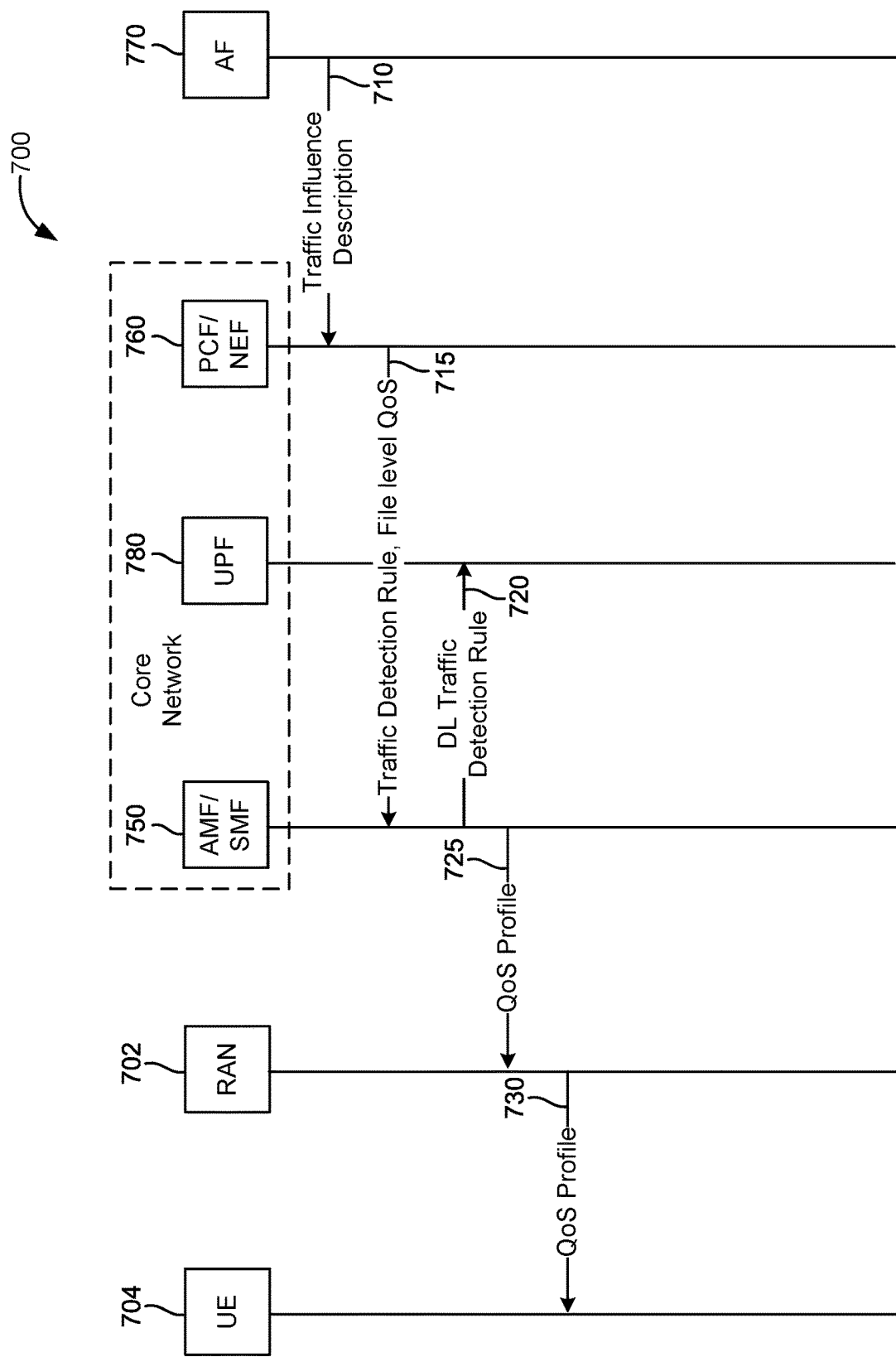
FIG. 7 illustrates an exemplary call flow for file traffic awareness, according to aspects of the disclosure.

FIG. 7 illustrates an exemplary call flow 700 for file traffic awareness, according to aspects of the disclosure. At 710, the AF 770 (which may correspond to AF 270 in FIG. 2A or the application server 285 in FIG. 2B) sends a traffic influence description to the PCF/NEF 760 (which may correspond to PCF 260 in FIG. 2A) over the N5 interface. The traffic influence description includes configuration information to enable the core network (e.g., the core network illustrated in FIG. 2A or 2B) to identify the file identifier, burst identifier, and file type for each file and burst of files in a downlink and/or uplink data flow, and to determine a file-level QoS policy (i.e., a file-level QoS profile) for the data flow. As described above, the traffic identifiers can be indicated by the AF 770 via the UDP/TCP port, an IPv6 flow label, or the fragmentation unit header in the RTP packets of the data flow. The AF 770 determining and transmitting the file-level QoS policy for the data flow may be considered as the AF 770 configuring the QoS profile. The AF 770 encoding the headers of the data flow may be considered the AF 770 enforcing the QoS profile.

At 715, based on the traffic influence description from the AF 770, the PCF/NEF 760 generates one or more traffic detection rules and a file-level QoS policy for the data stream and forwards them to the AMF/SMF 750 (which may correspond to AMF 240 and SMF 250 in FIG. 2A) over the N7 interface. The file detection rules may be one or more rules defining how to decode/extract the traffic identifiers from the headers of the data packets of the data flow. The file-level QoS policy may specify the FER and FDB (i.e., file-level QoS parameters) for the data flow.

At 720, if the data flow is a downlink data flow, the AMF/SMF 750 sends, to the UPF 780 (which may correspond to UPF 280 in FIG. 2A), one or more downlink traffic detection rules generated based on the one or more traffic detection rules received from the PCF/NEF 760. The file detection rules may be one or more rules defining how to decode/extract the traffic identifiers from the headers of the downlink data packets of the data flow. The UPF 780 identifies the application identifier of the application to which the data flow is destined based on one or more Application Detection Rules specified in the applicable standard. In an aspect, the Application Detection Rules may be configured to the UPF 780 by either an OAM (semi-static) or the SMF (dynamic) of the AMF/SMF 750. The SMF may determine the Application Detection Rules per request from the NEF or PCF of the PCF/NEF 760. The UPF 780 may derive the file identifier, burst identifier, and file type for the files of the data flow based on the application identifier. More specifically, the file identifier, file type, and burst identifier are included in the TCP/UDP port or IPv6 flow label, and the UPF 780 needs to know the mapping between the traffic identifiers and the port/label. This mapping is the traffic detection rule. The UPF 780 can then include this information in the GTP-U headers of downlink data packets destined for the UE 704 (which may correspond to any of the UEs described herein). Note that in some cases, the UPF 780 may not identify the application identifier and derive the file identifier, burst identifier, and file type based on the application identifier, depending on UPF implementation. The UPF 780 receiving the traffic detection rules for the data flow may be considered as the UPF 780 configuring a QoS profile for the data flow.

At 725, if the data flow is an uplink data flow, the AMF/SMF 750 sends, to the RAN 702 (which may correspond to RAN 202 in FIG. 2A or the RAN illustrated in FIG. 2B), a file-level QoS profile generated from the file-level QoS policy received from the PCF/NEF 760 at 715. The file-level QoS profile specifies the file-level QoS (e.g., FER, FDB) and one or more uplink traffic detection rules (e.g., one or more rules for decoding/extracting the traffic identifiers from the headers of the uplink data packets of the data flow). In an aspect, the SMF of the AMF/SMF 750 sends the file-level QoS profile to the RAN 702 in PDU Session Setup or Session Modification procedures. The RAN 702 receiving the file-level QoS profile from the AMF/SMF 750 may be considered as the RAN 702 configuring a QoS profile. The AMF/SMF 750 sends the file-level QoS profile to the UE 704 via NAS signaling.

At 730, the RAN 702 sends the QoS profile, which includes the file-level QoS and the one or more uplink traffic detection rules, to the UE 704. The RAN 702 sending the QoS profile to the UE 704 may be considered as the RAN 702 enforcing the QoS profile. The UE 704 can then use this information to extract the file identifier, burst identifier, and file type from the UDP/TCP port number and/or the IPv6 flow label of uplink packets from the application client (e.g., application client 662) or high-level operating system (HLOS), similar to what the UPF 780 does on the downlink. The UE 704 can then add this information to the headers (e.g., RLC/PDCP headers) of the uplink packets that it sends to the core network for the application client, as discussed above with reference to FIG. 6. The UE 704 can use the file-level QoS profile to enforce the file-level QoS by, for example, uplink traffic prioritization (when an uplink grant is received), a buffer status report (BSR), discarding uplink traffic, retransmitting uplink traffic, or any combination thereof. The UE 704 receiving the QoS profile may be considered as the UE 704 configuring the QoS profile. The UE 704 receiving as data flow from an application associated with the UE 704, encoding the file identifier and the file type in headers of each of one or more uplink PDUs for the data flow, and forwarding the one or more uplink PDUs to the RAN 702 may considered as the UE 704 enforcing the QoS profile.

In an aspect, there may be two protocol stack options, an XR/RTP/UDP/IP option, and an XR/HTTP/TCP/IP option. For the RTP option, the file identifier, burst identifier, and file type information may be carried in the fragmentation unit options A and B (FU-A and FU-B) of the RTP header. For the HTTP option, the file identifier, burst identifier, and file type information may be carried by HTTP in either a uniform resource locator (URL) or any HTTP tag. For these alternatives, the UPF and the UE should be able to understand and process Layer 7 (L7) protocols. In the core network, this may be supported based on service function chaining (SFC) or the traffic detection function (TDF)/policy and charging enforcement function (PCEF).

In an aspect, each file destined for a UE is included in only one QoS flow, but each QoS flow may have multiple files. In an aspect, the file-level QoS profile may be included in the current flow-level QoS profile in the NG, Xn, F1, and N1 interfaces.

The present disclosure proposes to modify the current standard to include a file-level QoS profile in the flow-level QoS profile. Each file-level QoS profile may include at least a file identifier, FER, FDB, file type, and file discard timer.

In an aspect, to convey which files belong to which burst, the transmitter can provide signaling similar to MBMS signaling. In MBMS, the base station first transmits the MBMS scheduling information (MSI) to the UE. The MSI includes the MBMS traffic channel (MTCH) and subframe mapping information. In the present case, for each file, the first packet could include control information such as the size of the file, the burst size/length of the file, file type, and number of packets. The UE can then receive and decode the file based on this information.

Note that while the foregoing disclosure has generally described operations relative to a 5G system and an XR application, the techniques of the present disclosure are equally applicable to any high bandwidth and/or low latency application (e.g., video or HTTP streaming applications) and any cellular data network that can support the QoS requirements of the application.

Figure 8:
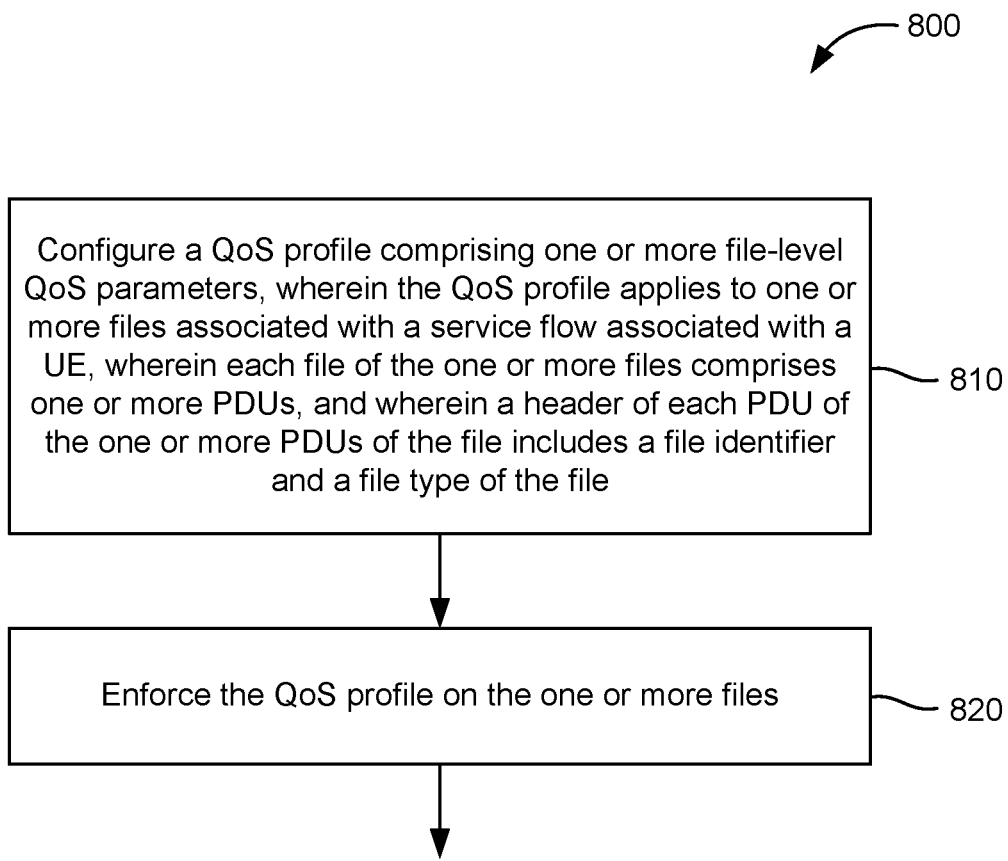
FIG. 8 illustrates an exemplary method for wireless communication, according to aspects of the disclosure.

FIG. 8 illustrates an exemplary method 800 of wireless communication, according to aspects of the disclosure. In an aspect, the method 800 may be performed by a network node, such as a UE, a base station, an application server, or a core network entity.

At 810, the network node configures a QoS profile comprising one or more file-level QoS parameters. The QoS profile applies to one or more files associated with a service flow associated with a UE (e.g., any of the UEs described herein). Each file of the one or more files comprises one or more PDUs. A header of each PDU of the one or more PDUs of the file includes a file identifier and a file type of the file. Where the network node is a UE, operation 810 may be performed by communication device 308, processing system 332, memory component 338, and/or traffic manager 344, any or all of which may be considered means for performing this operation. Where the network node is a base station, operation 810 may be performed by communication device 314, communication device 320, processing system 334, memory component 340, and/or traffic manager 346, any or all of which may be considered means for performing this operation. Where the network node is an application server or a core network entity, operation 810 may be performed by communication device 326, processing system 336, memory component 342, and/or traffic manager 348, any or all of which may be considered means for performing this operation.

At 820, the network node enforces the QoS profile on the one or more files. Where the network node is a UE, operation 820 may be performed by communication device 308, processing system 332, memory component 338, and/or traffic manager 344, any or all of which may be considered means for performing this operation. Where the network node is a base station, operation 820 may be performed by communication device 314, communication device 320, processing system 334, memory component 340, and/or traffic manager 346, any or all of which may be considered means for performing this operation. Where the network node is an application server or a core network entity, operation 820 may be performed by communication device 326, processing system 336, memory component 342, and/or traffic manager 348, any or all of which may be considered means for performing this operation.

Figure 9:
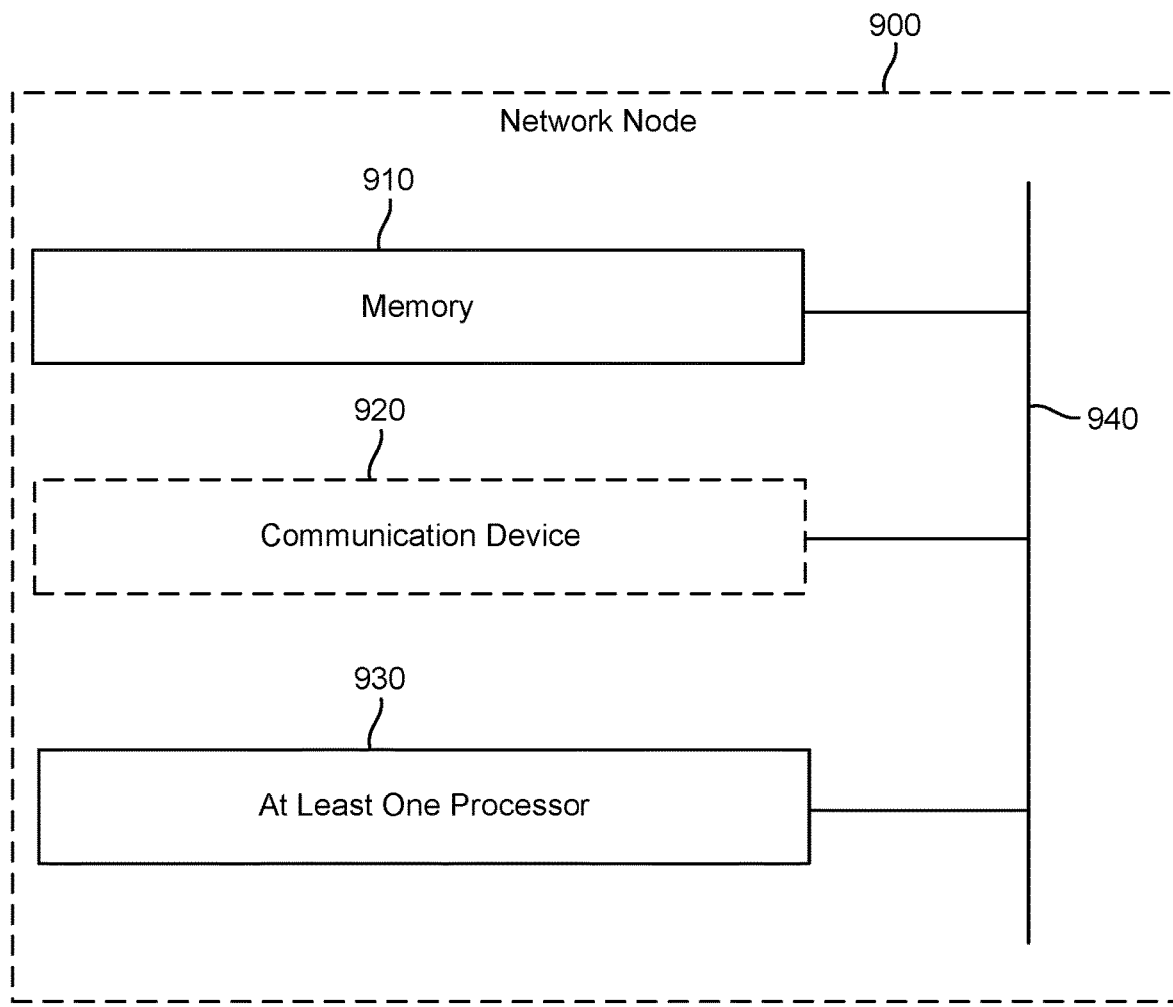
FIGS. 9 and 10 are simplified block diagrams of several sample aspects of apparatuses configured to support communication as taught herein.

FIG. 9 illustrates an exemplary network node 900. In an aspect, the network node 900 may be a network node, such as a UE, a base station, an application server, or a core network entity. The network node 900 may include a memory 910, an optional communication device 920, and at least one processor 930. The memory 910, the communication device 920, and the at least one processor 930 may be communicatively coupled to each other over a data bus 940.

Where the network node is a UE, the memory 910 may correspond to memory component 338, the communication device 920 may correspond to communication device 308, and the at least one processor 930 may correspond to processing system 332. Where the network node is a base station, the memory 910 may correspond to memory component 340, the communication device 920 may correspond to communication device 314 and/or communication device 320, and the at least one processor 930 may correspond to processing system 334. Where the network node is a core network entity or an application server, the memory 910 may correspond to memory component 342, the communication device 920 may correspond to communication device 326, and the at least one processor 930 may correspond to processing system 336.

Figure 10:
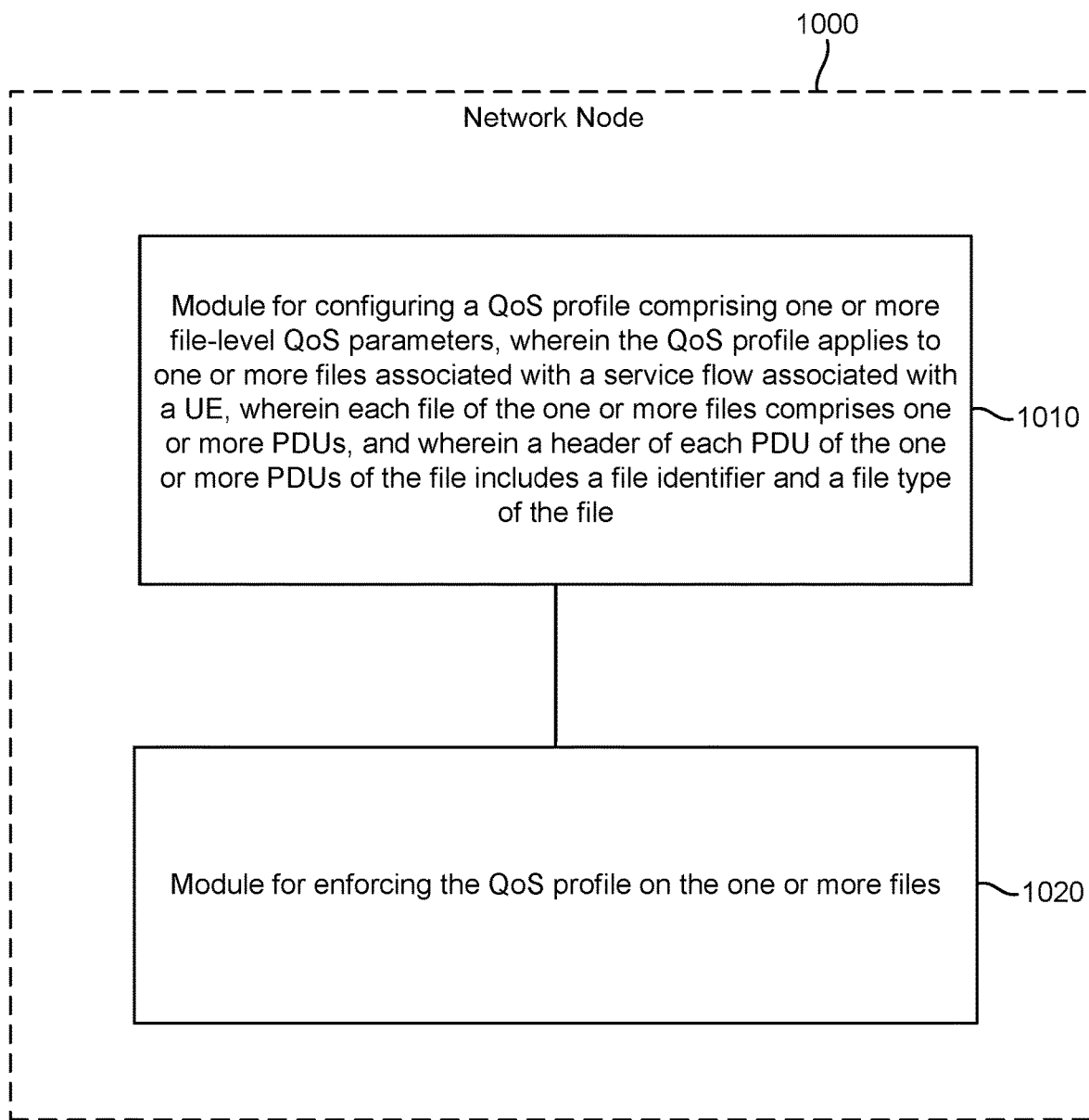

FIG. 10 illustrates an example network node 1000 represented as a series of interrelated functional modules. In an aspect, the network node 1000 may be a network node, such as a UE, a base station, an application server, or a core network entity. The network node 1000 may include a module for configuring 1010 and a module for enforcing 1020.

Where the network node is a UE, the module for configuring 1010 may correspond to memory component 338, communication device 308, processing system 332, and/or traffic manager 344. Where the network node is a base station, the module for configuring 1010 may correspond to memory component 340, communication device 314, communication device 320, processing system 334, and/or traffic manager 346. Where the network node is a core network entity or an application server, the module for configuring 1010 may correspond to memory component 342, communication device 326, processing system 336, and/or traffic manager 348.

Where the network node is a UE, the module for enforcing 1020 may correspond to memory component 338, communication device 308, processing system 332, and/or traffic manager 344. Where the network node is a base station, the module for enforcing 1020 may correspond to memory component 340, communication device 314, communication device 320, processing system 334, and/or traffic manager 346. Where the network node is a core network entity or an application server, the module for enforcing 1020 may correspond to memory component 342, communication device 326, processing system 336, and/or traffic manager 348.

The functionality of the modules of FIG. 10 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 10, as well as other components and functions described herein, may be implemented using any suitable means. Such means also may be implemented, at least in part, using corresponding structure as taught herein. For example, the components described above in conjunction with the "module for" components of FIG. 10 also may correspond to similarly designated "means for" functionality. Thus, in some aspects one or more of such means may be implemented using one or more of processor components, integrated circuits, or other suitable structure as taught herein.

The following provides an overview of examples of the present disclosure:

Example 1: A method of wireless communication performed by a network node, comprising: configuring a quality of service (QoS) profile comprising one or more file-level QoS parameters, wherein the QoS profile applies to one or more files associated with a service flow associated with a user equipment (UE), wherein each file of the one or more files comprises one or more protocol data units (PDUs), and wherein a header of each PDU of the one or more PDUs of the file includes a file identifier and a file type of the file; and enforcing the QoS profile on the one or more files.

Example 2: The method of examples 1, wherein: the network node comprises a network entity, the configuring comprises receiving, from an application server, the one or more files associated with the service flow associated with the UE, and the enforcing comprises: encoding the file identifier and the file type in headers of each of one or more downlink PDUs; and forwarding the one or more downlink PDUs to a radio access network (RAN) serving the UE.

Example 3: The method of examples 1 or 2, wherein the headers of the one or more PDUs comprise: user datagram protocol (UDP) headers or transmission control protocol (TCP) headers, or Internet protocol version 6 (IPv6) headers, and wherein the headers of the one or more downlink PDUs comprise: general packet radio service (GPRS) tunneling protocol (GTP) user plane (GTP-U) headers, or one or more packet data convergence protocol (PDCP) headers, one or more radio link control (RLC) headers, one or more service data adaptation protocol (SDAP) headers, or any combination thereof.

Example 4: The method of any one of examples 1 through 3, further comprising: receiving, at the network entity, file detection information for the one or more files from a session management function (SMF) or an operations, administration, and maintenance (OAM) function.

Example 5: The method of any one of examples 1 through 4, further comprising: identifying an identifier of the service flow based on service flow detection rules; and determining the file identifier and the file type from the headers of the one or more PDUs based on the service flow detection rules.

Example 6: The method of any one of examples 1 through 5, further comprising: receiving the QoS profile for the one or more files from a session management function (SMF).

Example 7: The method of any one of examples 1 through 6, further comprising: determining the file identifier and the file type from the headers of the one or more PDUs.

Example 8: The method of any one of examples 1 through 7, wherein the network entity comprises a user plane function (UPF).

Example 9: The method of example 1, wherein: the network node comprises a base station serving the UE, the configuring comprises receiving the QoS profile from an access and mobility management function (AMF)/session management function (SMF), and the enforcing comprises transmitting the QoS profile to the UE.

Example 10: The method of examples 1 or 9, wherein the QoS profile is received from the AMF/SMF in a PDU session setup procedure or a PDU session modification procedure.

Example 11: The method of examples 1, 9, or 10, further comprising: receiving the one or more PDUs from a user plane function (UPF).

Example 12: The method of example 1, wherein: the network node comprises an application server, the method further comprises transmitting, to a user plane function (UPF), the one or more files associated with the service flow associated with the UE, and the configuring comprises: determining the QoS profile for the one or more files; and transmitting the QoS profile to a session management function (SMF).

Example 13: The method of examples 1 or 12, wherein the enforcing comprises: the headers of the one or more PDUs comprising user datagram protocol (UDP) headers or transmission control protocol (TCP) headers, the headers of the one or more PDUs comprising Internet protocol version 6 (IPv6) headers, or the headers of the one or more PDUs comprising RTP headers.

Example 14: The method of examples 1, 12, or 13, wherein the transmitting comprises transmitting the QoS profile to the SMF via a policy control function (PCF) or network exposure function (NEF).

Example 15: The method of example 1, wherein: the network node comprises the UE, the configuring comprises receiving the QoS profile from an access and mobility management function (AMF)/session management function (SMF), and the enforcing comprises: receiving, from an application associated with the UE, the one or more files, the one or more files destined for an application server, encoding the file identifier and the file type in headers of each of one or more uplink PDUs; and forwarding the one or more uplink PDUs to a radio access network (RAN) serving the UE.

Example 16: The method of examples 1 or 15, further comprising: determining the file identifier and the file type from the headers of the one or more PDUs.

Example 17: The method of examples 1, 15, or 16, wherein the headers of the one or more PDUs comprise: user datagram protocol (UDP) headers or transmission control protocol (TCP) headers, or Internet protocol version 6 (IPv6) headers, and wherein the one or more PDUs comprise: one or more Internet protocol (IP) data packets, or one or more real-time transport protocol (RTP) packets.

Example 18: The method of any one of example 1 and 15 through 17, wherein the file identifier and the file type are carried in fragmentation unit header options FU-A and FU-B of the one or more RTP packets.

Example 19: The method of any one of examples 1 and 15 through 18, wherein the headers of the one or more uplink PDUs comprise one or more packet data convergence protocol (PDCP) headers, one or more radio link control (RLC) headers, one or more service data adaptation protocol (SDAP) headers, or any combination thereof.

Example 20: The method of any one of examples 1 and 15 through 19, wherein the application is an extended reality (XR) application.

Example 21: The method of any one of examples 1 and 15 through 20, wherein the XR application is running on an XR device separate from the UE.

Example 22: The method of any one of examples 1 and 15 through 21, wherein the XR device comprises a virtual reality (VR) headset or augmented reality (AR) glasses.

Example 23: The method of any one of examples 1 and 15 through 20, wherein the XR application is running on the UE.

Example 24: The method of any one of examples 1 through 23, wherein the UE comprises a handheld touchscreen device.

Example 25: The method of any one of examples 1 through 24, wherein the one or more file-level QoS parameters include at least the file identifier, the file type, a file error rate (FER), a file delay budget (FDB), and a file discard timer for each type of file of the one or more files.

Example 26: An apparatus for wireless communication comprising a processor, memory coupled with the processor, the processor and memory configured to perform a method of any one of examples 1 through 25.

Example 27: An apparatus for wireless communication comprising at least one means for performing a method of any one of examples 1 through 25.

Example 28: A non-transitory computer-readable medium storing code for wireless communication comprising a processor, memory coupled with the processor, and instructions stored in the memory and executable by the processor to cause the apparatus to perform a method of any one of examples 1 through 25.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying methods for file transmission management in a cellular system.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of wireless communication performed by a network entity, comprising:

receiving, from an application server, a burst of one or more application layer files associated with a service flow associated with a user equipment (UE);

receiving a quality of service (QoS) profile associated with the one or more application layer files, the QoS profile comprising one or more application layer file-level QoS parameters, wherein the QoS profile applies to the one or more application layer files associated with the service flow associated with the UE, wherein each application layer file of the one or more application layer files comprises one or more protocol data units (PDUs), wherein the one or more application layer file-level QoS parameters include at least a file identifier, a file error rate (FER), and a file delay budget (FDB) for the application layer file, and wherein a header of each PDU of the one or more PDUs of the application layer file includes the file identifier of the application layer file;

encoding the file identifier in headers of each of one or more downlink PDUs; and forwarding, based on the QoS profile, the one or more downlink PDUs to a radio access network (RAN) serving the UE.

2. The method of claim 1, wherein the headers of the one or more PDUs comprise:

user datagram protocol (UDP) headers or transmission control protocol (TCP) headers, or Internet protocol version 6 (IPv6) headers, and wherein the headers of the one or more downlink PDUs comprise:

general packet radio service (GPRS) tunneling protocol (GTP) user plane (GTP-U) headers, or one or more packet data convergence protocol (PDCP) headers, one or more radio link control (RLC) headers, one or more service data adaptation protocol (SDAP) headers, or any combination thereof.

3. The method of claim 1, further comprising:

receiving, at the network entity, file detection information for the one or more application layer files from a session management function (SMF) or an operations, administration, and maintenance (OAM) function.

4. The method of claim 1, further comprising:

identifying an identifier of the service flow based on service flow detection rules; and determining the file identifier from the headers of the one or more PDUs based on the service flow detection rules.

5. The method of claim 1, further comprising:

receiving the QoS profile for the one or more application layer files from a session management function (SMF).

6. The method of claim 1, further comprising:

determining the file identifier from the headers of the one or more PDUs.

7. The method of claim 1, wherein the network entity comprises a user plane function (UPF).

8. The method of claim 1, wherein the one or more application layer file-level QoS parameters further include a file discard timer for each type of application layer file of the one or more application layer files.

9. The method of claim 1, wherein the one or more application layer file-level QoS parameters further include a file type.

10. A network entity, comprising:

one or more memories;

one or more transceivers; and one or more processors communicatively coupled to the one or more memories and the one or more transceivers, the one or more processors, either alone or in combination, configured to:

receive, via the one or more transceivers, from an application server, a burst of one or more application layer files associated with a service flow associated with a user equipment (UE);

receive, via the one or more transceivers, a quality of service (QoS) profile associated with the one or more application layer files, the QoS profile comprising one or more application layer file-level QoS parameters, wherein the QoS profile applies to the one or more application layer files associated with the service flow associated with the UE, wherein each application layer file of the one or more application layer files comprises one or more protocol data units (PDUs), wherein the one or more application layer file-level QoS parameters include at least a file identifier, a file error rate (FER), and a file delay budget (FDB) for the application layer file, and wherein a header of each PDU of the one or more PDUs of the application layer file includes the file identifier of the application layer file;

encode the file identifier in headers of each of one or more downlink PDUs; and forward, based on the QoS profile, the one or more downlink PDUs to a radio access network (RAN) serving the UE.

11. The network entity of claim 10, wherein the headers of the one or more PDUs comprise:

user datagram protocol (UDP) headers or transmission control protocol (TCP) headers, or Internet protocol version 6 (IPv6) headers, and wherein the headers of the one or more downlink PDUs comprise:

general packet radio service (GPRS) tunneling protocol (GTP) user plane (GTP-U) headers, or one or more packet data convergence protocol (PDCP) headers, one or more radio link control (RLC) headers, one or more service data adaptation protocol (SDAP) headers, or any combination thereof.

12. The network entity of claim 10, wherein the one or more processors, either alone or in combination, are further configured to:

receive, via the one or more transceivers, file detection information for the one or more application layer files from a session management function (SMF) or an operations, administration, and maintenance (OAM) function.

13. The network entity of claim 10, wherein the one or more processors, either alone or in combination, are further configured to:

identify an identifier of the service flow based on service flow detection rules; and determine the file identifier from the headers of the one or more PDUs based on the service flow detection rules.

14. The network entity of claim 10, wherein the one or more processors, either alone or in combination, are further configured to:

receive, via the one or more transceivers, the QoS profile for the one or more application layer files from a session management function (SMF).

15. The network entity of claim 10, wherein the one or more processors, either alone or in combination, are further configured to:

determine the file identifier from the headers of the one or more PDUs.

16. The network entity of claim 10, wherein the network entity comprises a user plane function (UPF).

17. The network entity of claim 10, wherein the one or more application layer file-level QoS parameters further include a file discard timer for each type of application layer file of the one or more application layer files.

18. The network entity of claim 10, wherein the one or more application layer file-level QoS parameters further include a file type.

19. A network entity, comprising:

receiving, from an application server, a burst of one or more application layer files associated with a service flow associated with a user equipment (UE);

receiving a quality of service (QoS) profile associated with the one or more application layer files, the QoS profile comprising one or more application layer file-level QoS parameters, wherein the QoS profile applies to the one or more application layer files associated with the service flow associated with the UE, wherein each application layer file of the one or more application layer files comprises one or more protocol data units (PDUs), wherein the one or more application layer file-level QoS parameters include at least a file identifier, a file error rate (FER), and a file delay budget (FDB) for the application layer file, and wherein a header of each PDU of the one or more PDUs of the application layer file includes the file identifier of the application layer file;

encoding the file identifier in headers of each of one or more downlink PDUs; and forwarding, based on the QoS profile, the one or more downlink PDUs to a radio access network (RAN) serving the UE.

20. The network entity of claim 19, wherein the network entity comprises a user plane function (UPF).

* * * * *